(12) United States Patent
Holman et al.

(10) Patent No.: US 11,099,680 B2
(45) Date of Patent: Aug. 24, 2021

(54) MATRIX SENSOR WITH RECEIVE ISOLATION

(71) Applicant: Tactual Labs Co., New York, NY (US)

(72) Inventors: David Holman, Toronto (CA); David Clark Wilkinson, Austin, TX (US); Ricardo Jorge Jota Costa, Toronto (CA); Bruno Rodrigues De Araujo, Toronto (CA); Adam Landa, Forest City, FL (US)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 16/251,855

(22) Filed: Jan. 18, 2019

(65) Prior Publication Data

US 2019/0227625 A1 Jul. 25, 2019

Related U.S. Application Data

(60) Provisional application No. 62/619,656, filed on Jan. 19, 2018, provisional application No. 62/621,117, filed on Jan. 24, 2018, provisional application No. 62/657,120, filed on Apr. 13, 2018, provisional application No. 62/657,270, filed on Apr. 13, 2018.

(51) Int. Cl.
| | |
|---|---|
| *G06F 3/01* | (2006.01) |
| *G06F 3/041* | (2006.01) |
| *G06F 3/044* | (2006.01) |
| *G06F 3/046* | (2006.01) |
| *H01Q 1/48* | (2006.01) |
| *H01Q 1/52* | (2006.01) |
| *H01Q 21/06* | (2006.01) |

(52) U.S. Cl.
CPC ............ *G06F 3/0416* (2013.01); *G06F 3/014* (2013.01); *G06F 3/017* (2013.01); *G06F 3/044* (2013.01); *G06F 3/046* (2013.01); *G06F 3/0446* (2019.05); *G06F 3/04182* (2019.05); *H01Q 1/48* (2013.01); *H01Q 1/523* (2013.01); *H01Q 21/061* (2013.01); *G06F 2203/04102* (2013.01); *G06F 2203/04104* (2013.01)

(58) Field of Classification Search
CPC ..... G06F 3/011–017; G06F 3/041–047; G06F 1/1652; G09F 9/301; G09G 2380/02; H04M 1/0268
See application file for complete search history.

(56) References Cited

U.S. PATENT DOCUMENTS

| | | | | |
|---|---|---|---|---|
| 6,498,590 | B1 * | 12/2002 | Dietz | G06F 3/0446 |
| | | | | 343/893 |
| RE41,731 | E * | 9/2010 | Dietz | G06F 3/038 |
| | | | | 343/893 |
| 9,223,446 | B2 * | 12/2015 | Kauko | G06F 3/04186 |
| 9,733,769 | B2 * | 8/2017 | Ding | G06F 3/0412 |
| 10,474,291 | B2 * | 11/2019 | Lu | G06F 3/04166 |

(Continued)

*Primary Examiner* — Gene W Lee
(74) *Attorney, Agent, or Firm* — Adam Landa

(57) ABSTRACT

A sensor system comprises a plurality of receiving antennas. Another antenna functions as an isolating antenna that assists in preventing a signal received at some of the receiving antennas from being interfered with by the other receiving antennas. The isolating antenna may be operably connected to a ground or the source of signal that is also infused into a user.

20 Claims, 24 Drawing Sheets

(56) References Cited

U.S. PATENT DOCUMENTS

| | | | |
|---|---|---|---|
| 2011/0193818 A1* | 8/2011 | Chen | G06F 3/041 |
| | | | 345/174 |
| 2015/0070248 A1* | 3/2015 | Tsai | G09F 9/00 |
| | | | 345/1.2 |
| 2015/0105125 A1* | 4/2015 | Min | G04C 3/002 |
| | | | 455/566 |
| 2015/0301661 A1* | 10/2015 | Leigh | G02F 1/13338 |
| | | | 345/174 |
| 2016/0034079 A1* | 2/2016 | Suzuki | G06F 3/044 |
| | | | 345/173 |
| 2016/0224147 A1* | 8/2016 | Ding | G06F 3/0446 |
| 2017/0168625 A1* | 6/2017 | Shin | H04M 1/0202 |
| 2017/0293386 A1* | 10/2017 | Seder | G06F 3/0443 |
| 2018/0181258 A1* | 6/2018 | Lu | G06F 3/044 |
| 2018/0188894 A1* | 7/2018 | Feinstein | G04G 21/08 |
| 2018/0267660 A1* | 9/2018 | Shepelev | G02F 1/13338 |
| 2019/0087030 A1* | 3/2019 | Shepelev | G06F 3/044 |

* cited by examiner

MATRIX SENSOR WITH RECEIVE ISOLATION

This application claims the benefit of U.S. Provisional Patent Application No. 62/619,656, filed Jan. 19, 2018; this application further claims the benefit of U.S. Provisional Patent Application No. 62/621,117, filed Jan. 24, 2018, U.S. Provisional Patent Application No. 62/657,120, filed Apr. 13, 2018 and U.S. Provisional Patent Application No. 62/657,270, filed Apr. 13, 2018, the contents of all the aforementioned applications are hereby incorporated by reference.

FIELD

The disclosed system and method relate, in general, to the field of human computer interaction.

BRIEF DESCRIPTION OF THE DRAWINGS

The foregoing and other objects, features, and advantages of the disclosure will be apparent from the following more particular descriptions of embodiments as illustrated in the accompanying drawings, in which the reference characters refer to the same parts throughout the various views. The drawings are not necessarily to scale, with emphasis instead being placed upon illustrating principles of the disclosed embodiments.

DESCRIPTION

Figure 1:
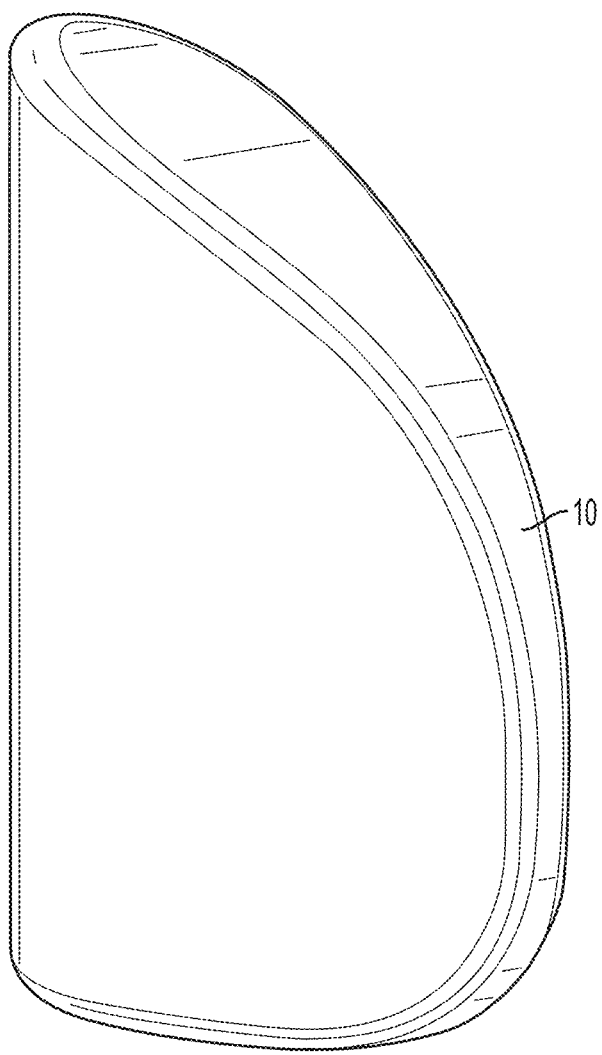
FIG. 1 shows an illustration of a hand-held controller that may be used to model the movement and position of a hand holding the controller.

There have been various attempts to develop touch sensors that can detect hover at further distances above the sensor surface. One approach is described in US Patent Application No. 62/428,862 filed Dec. 1, 2016 and entitled Signal Injection to Enhance Appendage Detection and Characterization, the contents of which are hereby incorporated by reference. According to that specification, the invention therein relates to touch and in-air sensitive input devices. That document describes the use of signal injection (a/k/a signal infusion) to enhance appendage detection. Further disclosures concerning hover-seeking technologies can be found in U.S. Provisional Patent Application No. 62/488,753 file Apr. 22, 2017 and entitled Heterogenous Sensing Apparatus and Method, the contents of which are hereby incorporated by reference, which, among other things, disclosed certain infusion techniques for use on a handheld sensor. Subsequently further disclosures were made in U.S. Provisional Patent Application No. 62/588,267, filed Nov. 17, 2017 and entitled Sensing Controller, the contents of which are hereby incorporated by reference.

Trying to understand and model the position of a hand with respect to a sensor presents several challenges, among them interference. For example, in an infusion system, signal from nearby digits may be confused with signal from another digit. U.S. Provisional Patent Application No. 62/533,405, filed Jul. 17, 2017, entitled Apparatus and Methods for Enhancing Digit Separation and Reproduction described techniques for digit separation, the contents of which are hereby incorporated by reference. While better methods of finger separation may be developed to use existing sensor data, what is needed is a sensor that can reduce interference from e.g., nearby digits.

This application is related to and implements concepts disclosed in U.S. Provisional Patent Application No. 62/473,908, entitled "Hand Sensing Controller"; U.S. Provisional Patent Application No. 62/488,753, entitled "Heterogenous Sensing Apparatus and Methods"; U.S. Provisional Patent Application No. 62/533,405, entitled "Apparatus and Methods for Enhancing Digit Separation and Reproduction"; and U.S. Provisional Patent Application No. 62/588,267, entitled "Sensing Controller"; the contents of which are all incorporated herein by reference.

The presently disclosed systems and methods provide for designing, manufacturing and using capacitive touch sensors, and particularly capacitive touch sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. Pat. No. 9,019,224, entitled "Low-Latency Touch Sensitive Device" and U.S. Pat. No. 9,158,411 entitled "Fast Multi-Touch Post Processing." These applications contemplate FDM, CDM, or FDM/CDM hybrid touch sensors which may be used in connection with the presently disclosed sensors. In such sensors, touches are sensed when a signal from a row is coupled (increased) or decoupled (decreased) to a column and the result received on that column. By sequentially exciting the rows and measuring the coupling of the excitation signal at the columns, a heatmap reflecting capacitance changes, and thus proximity, can be created.

This application also employs principles used in fast multi-touch sensors and other interfaces disclosed in the following: U.S. Pat. Nos. 9,933,880; 9,019,224; 9,811,214; 9,804,721; 9,710,113; and 9,158,411. Familiarity with the disclosure, concepts and nomenclature within these patents is presumed. The entire disclosure of those patents and the applications incorporated therein by reference are incorporated herein by reference. This application also employs principles used in fast multi-touch sensors and other interfaces disclosed in the following: U.S. patent application Ser. Nos. 15/162,240; 15/690,234; 15/195,675; 15/200,642; 15/821,677; 15/904,953; 15/905,465; 15/943,221; 62/540,458, 62/575,005, 62/621,117, 62/619,656 and PCT publication PCT/US2017/050547, familiarity with the disclosures, concepts and nomenclature therein is presumed. The entire disclosure of those applications and the applications incorporated therein by reference are incorporated herein by reference.

Throughout this disclosure, the terms "touch", "touches", "touch event", "contact", "contacts", "hover", or "hovers", "gesture", "pose" or other descriptors may be used to describe events or periods of time in which a user's finger, a stylus, an object, or a body part is detected by a sensor. In some sensors, detections occur only when the user is in physical contact with a sensor, or a device in which it is embodied. In some embodiments, and as generally denoted by the word "contact", these detections occur as a result of physical contact with a sensor, or a device in which it is embodied. In other embodiments, and as sometimes generally referred to by the terms "hover", "gesture" or "pose" the sensor may be tuned to allow for the detection of "touch events" that are at a distance above the touch surface or otherwise separated from the sensor device and causes a recognizable change, despite the fact that the conductive or capacitive object, e.g., a stylus or pen, is not in actual physical contact with the surface. Therefore, the use of language within this description that implies reliance upon sensed physical contact should not be taken to mean that the techniques described apply only to those embodiments; indeed, nearly all, if not all, of what is described herein would apply equally to "contact", "hover", "pose" and "gesture" each of which is a touch or touch event. Generally, as used herein, the word "hover" refers to non-contact touch events or touch, and as used herein the terms "hover", "pose" and "gesture" are types of "touch" in the sense that "touch" is intended herein. Thus, as used herein, the phrase "touch event" and the word "touch" when used as a noun include a near touch and a near touch event, or any other gesture that can be identified using a sensor. "Pressure" refers to the force per unit area exerted by a user contact (e.g., presses by their fingers or hand) against the surface of an object. The amount of "pressure" is similarly a measure of "contact", i.e., "touch". "Touch" refers to the states of "hover", "contact", "gesture", "pose", "pressure", or "grip", whereas a lack of "touch" is generally identified by signals being below a threshold for accurate measurement by the sensor. In accordance with an embodiment, touch events may be detected, processed, and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency-orthogonal to each other, in which case, they could not be the same frequency.

Certain principles of a fast multi-touch (FMT) sensor are known in the art and/or have been disclosed in patent applications filed prior to the date of this filing. In an embodiment, orthogonal signals are transmitted into a plurality of drive conductors, and the information received by receivers attached to a plurality of sense conductors is analyzed by a signal processor to identify touch. Drive and sense conductors (also sometimes called rows and columns) may be organized in a variety of configurations, including, e.g., a matrix where the crossing points form nodes, and touch interactions are detected at those nodes by processing of the column or sense signals. In an embodiment where the orthogonal signals are frequency orthogonal, spacing between the orthogonal frequencies, $\Delta f$, is at least the reciprocal of the measurement period $\tau$, the measurement period T being equal to the period during which the columns are sampled. Thus, in an embodiment, a column may be measured for one millisecond (i) using frequency spacing ($\Delta f$) of one kilohertz (i.e., $\Delta f = 1/\tau$).

In an embodiment, the signal processor of a mixed signal integrated circuit (or a downstream component or software) is adapted to determine at least one value representing each frequency orthogonal signal transmitted to a row. In an embodiment, the signal processor of the mixed signal integrated circuit (or a downstream component or software) performs a Fourier transform to received signals. In an embodiment, the mixed signal integrated circuit is adapted to digitize received signals. In an embodiment, the mixed signal integrated circuit (or a downstream component or software) is adapted to digitize received signals and perform a discrete Fourier transform (DFT) on the digitized information. In an embodiment, the mixed signal integrated circuit (or a downstream component or software) is adapted to digitize received signals and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., window) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that, the term orthogonal as used herein is not "violated" by such small contributions. In other words, as we use the term frequency orthogonal herein, two signals are considered frequency orthogonal if substantially all of the contribution of one signal to the DFT bins is made to different DFT bins than substantially all of the contribution of the other signal.

In an embodiment, received signals are sampled at at least 1 MHz. In an embodiment, received signals are sampled at at least 2 MHz. In an embodiment, received signals are sampled at 4 Mhz. In an embodiment, received signals are sampled at 4.096 Mhz. In an embodiment, received signals are sampled at more than 4 MHz.

To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and not achieving kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmit antenna 130. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decrease, the integration period may be adjusted, the frequency range may be adjusted, etc.

In an embodiment, a DFT (which can be an FFT) output comprises a bin for each frequency-orthogonal signal that is transmitted. In an embodiment, each DFT (which can be an FFT) bin comprises an in-phase (I) and quadrature (Q) component. In an embodiment, the sum of the squares of the I and Q components is used as measure corresponding to signal strength for that bin. In an embodiment, the square root of the sum of the squares of the I and Q components is used as measure corresponding to signal strength for that bin. It will be apparent to a person of skill in the art in view of this disclosure that a measure corresponding to the signal strength for a bin could be used as a measure related to touch. In other words, the measure corresponding to signal strength in a given bin would change as a result of a touch event.

Generally, as the term is used herein, injection or infusion refers to the process of transmitting signals to the body of a user, effectively allowing the body (or parts of the body) to become an active transmitting source of the signal. In an embodiment, an electrical signal is injected into the hand (or other part of the body) and this signal can be detected by a sensor even when the hand (or fingers or other part of the body) are not in direct contact with the sensor's touch surface. To some degree, this allows the proximity and orientation of the hand (or finger or some other body part) to be determined, relative to a surface. In an embodiment, signals are carried (e.g., conducted) by the body, and depending on the frequencies involved, may be carried near the surface or below the surface as well. In an embodiment, frequencies of at least the KHz range may be used in frequency injection. In an embodiment, frequencies in the MHz range may be used in frequency injection. To use infusion in connection with FMT as described above, in an embodiment, an infusion signal can be selected to be orthogonal to the drive signals, and thus it can be seen in addition to the other signals on the sense lines.

In various embodiments, the present disclosure is directed to systems (e.g., objects, controllers, panels or keyboards) sensitive to hover, contact, pressure, gestures and body posturing and their applications in real-world, artificial reality, virtual reality and augmented reality settings. It will be understood by one of ordinary skill in the art that the disclosures herein apply generally to all types of systems using fast multi-touch to detect hover, contact, pressure, gestures and body posturing.

The term "controller" as used herein is intended to refer to a physical object that provides the function of human-machine interface. In an embodiment, the controller may be handlebars of vehicle, such as a motorcycle. In an embodiment, the controller may be the steering wheel of vehicle, such as car or boat. In an embodiment, the controller is able to detect the movements of a hand by sensing such movements directly. In an embodiment, the controller may be the interface used with a video game system. In an embodiment, the controller may provide the position of a hand. In an embodiment, the controller may provide pose, position and/or movement of other body parts through the determination of movement proximate to and/or associated with the body part and/or function, for example, the articulation of the bones, joints and muscles and how it translates into the position and/or movement of the hand or foot.

The controllers discussed herein use antennas that function as transmitting antennas and receiving antennas. However, it should be understood that whether the antennas are transmitting, receiving, or both depends on context and the embodiment. When used for transmitting, the conductor is operatively connected to a signal generator. When used for receiving, the conductor is operatively connected to a signal receiver. In an embodiment, the transmitting antennas and receiving antennas for all or any combination of the patterns are operatively connected to a single integrated circuit capable of transmitting and receiving the required signals. In an embodiment, the transmitting antennas and receiving antennas are each operatively connected to a different integrated circuit capable of transmitting and receiving the required signals, respectively. In an embodiment, the transmitting antennas and receiving antennas for all or any combination of the patterns may be operatively connected to a group of integrated circuits, each capable of transmitting and receiving the required signals, and together sharing information necessary to such multiple IC configuration. In an embodiment, where the capacity of the integrated circuit (i.e., the number of transmit and receive channels) and the requirements of the patterns (i.e., the number of transmit and receive channels) permit, all of the transmitting antennas and receiving antennas for all of the multiple patterns used by a controller are operated by a common integrated circuit, or by a group of integrated circuits that have communications therebetween. In an embodiment, where the number of transmit or receive channels requires the use of multiple integrated circuits, the information from each circuit is combined in a separate system. In an embodiment, the separate system comprises a GPU and software for signal processing.

The purpose of the transmitting antennas and receiving antennas discussed herein are to detect touch events, movements, motions, and gestures, such as hover, proximity, hand position, gestures, poses, etc. with 3D positional fidelity. The transmitted signals can be transmitted in a particular direction. In an embodiment a mixed signal integrated circuit is used. The mixed signal integrated circuit comprises a signal generator, transmitter, receiver and signal processor. In an embodiment, the mixed signal integrated circuit is adapted to generate one or more signals and transmit the signals. In an embodiment, the mixed signal integrated circuit is adapted to generate a plurality of frequency orthogonal signals and send the plurality of frequency orthogonal signals to the transmitting antennas. In an embodiment, the frequency orthogonal signals are in the range from DC up to about 2.5 GHz. In an embodiment, the frequency orthogonal signals are in the range from DC up to about 1.6 MHz. In an embodiment, the frequency orthogonal signals are in the range from 50 KHz to 200 KHz. The frequency spacing between the frequency orthogonal signals is typically greater than or equal to the reciprocal of an integration period (i.e., the sampling period). In an embodiment, the frequency of the signal is not changed and the amplitude of the signal is modulated instead.

The principles discussed above are used in addition to other features of the signal transmission in order to obtain meaningful information regarding positions, gestures, motions, postures, touch events, etc. of various body parts. In an embodiment, the system and methods disclosed herein use various properties of the transmitted signals in order to process this information to provide accurate depictions of hand positions and gestures.

FIG. 1 shows an illustration of a hand-held controller 10 that may be used to model the movement and position of a hand holding the controller 10. Receiving and transmitting antennas are placed around the controller 10. In an embodiment, the receiving and transmitting antennas are placed in one layer around the controller 10. In an embodiment, the receiving and transmitting antennas are placed in multiple layers around the controller 10.

The receiving and transmitting antennas can be operated selectively as either transmitting antennas or receiving antennas depending on the needs of the controller 10. The operation of the transmitting antennas and receiving antennas in matrix and other arrays are discussed in detail below. The controller 10 discussed herein is operated via the use of transmitting antennas transmitting signals that are orthogonal with respect to each other signal transmitted. In particular, in the embodiments discussed herein the signals are frequency orthogonal with respect to each other. Additionally, the controller 10 may have incorporated therein a signal infuser that can infuse (inject) a signal into the hand of the user of the controller 10. The signal infuser is a transmitting antenna that transmits signal into the user so that the user becomes the carrier of the signal that is then detected by receiving antennas around the controller 10. The infused signal can be received at the receiving antennas that are located around the controller 10. Furthermore, there may be multiple infusion points used on the controller 10.

Figure 2:
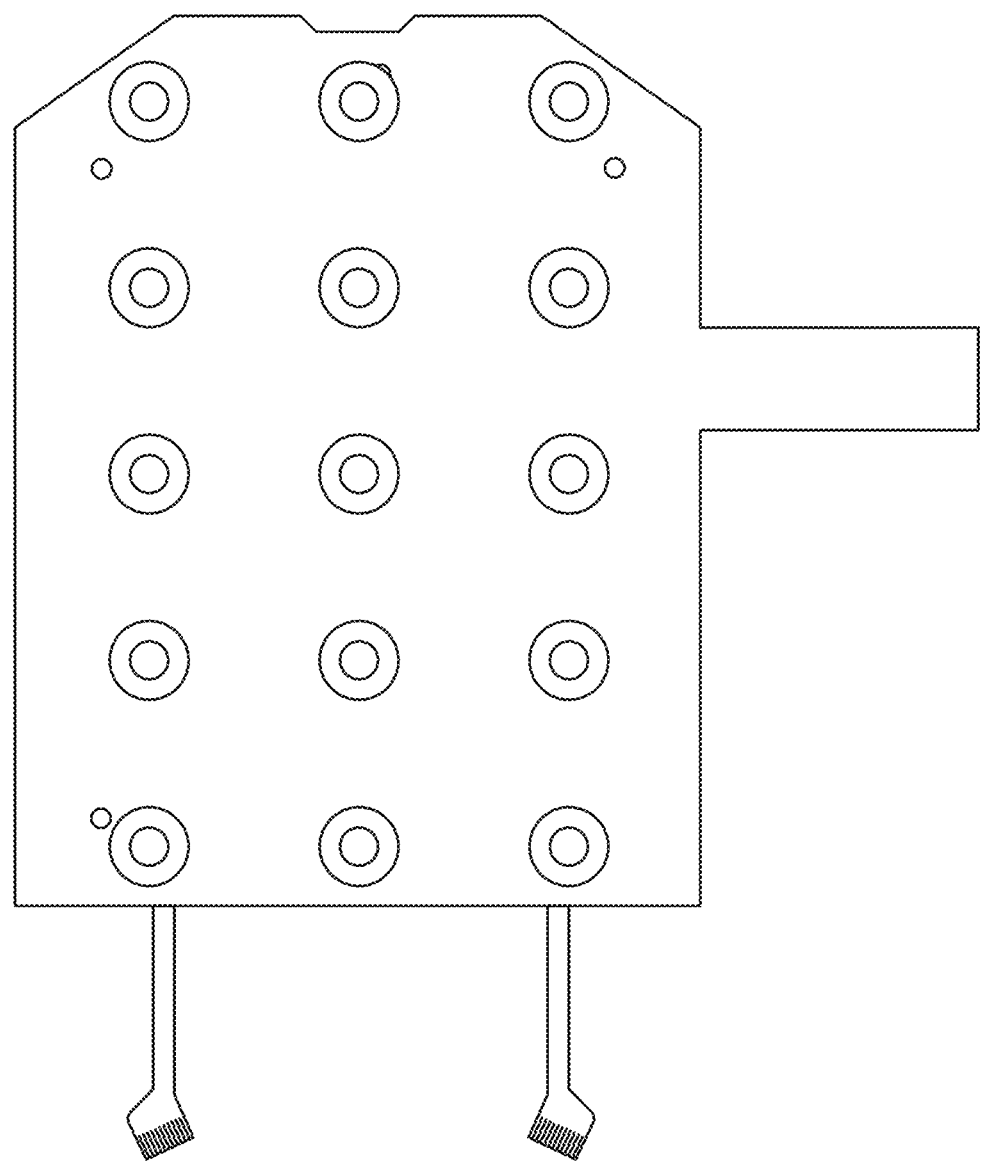
FIG. 2 is a high level diagram illustrating a flexible sensor sheet that may be used in connection with the hand-held controller shown in FIG. 1.

FIG. 2 is an exemplary embodiment of a flexible sensor sheet 20 that may be used in connection with the embodiment of the hand-held controller 10 shown in FIG. 1. Although five rows consisting of three receiving antennas 21 each are shown, these numbers are arbitrary, subject to considerations discussed below, and could be more or less. In an embodiment, the fifteen receiving antennas 21 are adapted to receive an infusion signal that has been infused into a human hand. The infusion signal may be infused through a variety of means at a variety of locations, e.g., through a wrist band, through a seat, or even via an electrode located elsewhere on the controller. Regardless of where and how the infusion signal is generated, with the signal infused onto the hand, the signal will radiate from all points of the hand. (Multiple infusion signals from the same, or different locations, may also be used.)

In an embodiment, as the hand moves and/or wraps about the controller, one or more individual fingers change their relative distance from the receiving antenna 21. Because the infusion signal decreases with the distance between the finger and the receiving antenna 21, in an embodiment, fingers closer to receiving antennas 21 will make a stronger contribution than fingers farther away. In the illustrated embodiment, five rows of three receiving antennas 21 are used, each pair of adjacent rows of receiving antennas 21 corresponding to the position of a fingers wrapped about the controller, and each of the receiving antennas 21 corresponding to the position of one of the finger segments wrapped about the controller. In an embodiment, four rows of three receiving antennas 21 are used, each of the rows of receiving antennas 21 corresponding to the position of a fingers wrapped about the controller, and each of the receiving antennas 21 corresponding to the position of one of the finger segments wrapped about the controller. In an embodiment, three rows of three receiving antennas 21 are used, each of the rows of receiving antennas 21 corresponding to the inter-finger on a hand wrapped about the controller, and each of the receiving antennas 21 corresponding to the position of one of the finger segments wrapped about the controller.

Because receiving antennas 21 are omnidirectional when sensing, it may be difficult to identify the position of a probe (e.g., finger) within the volume of the receiving antenna 21. Thus it would be desirable to constrain or steer the volume of a receiving antenna 21 in order to more easily identify the position of a probe. When reconstructing the hands, for example, unconstrained receiving antennas close to an index finger can receive contributions from the middle, ring, and pinky finger. This behavior introduces signal confounds and makes it more difficult to reconstruct finger movement.

In an embodiment, an isolation antenna (a/k/a isolation conductor, isolation trace) can be placed near a receiving antenna 21 to constrain its sensing volume.

Figure 3:
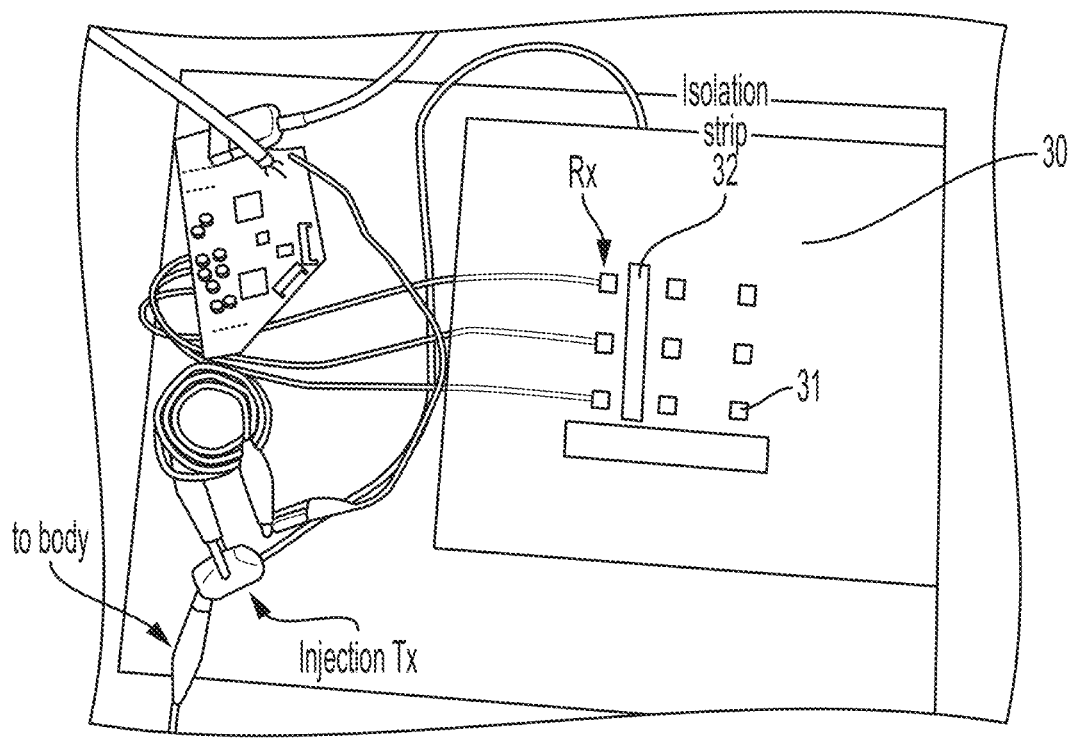
FIG. 3 shows an embodiment of line isolation.

Turning to FIG. 3, an exemplary embodiment is shown that is using an isolation antenna 32 on a sensor 30 employing three rows of three receiving antennas 31 each. An isolation antenna 32 (labeled isolation strip) is disposed between a first row of three receiving antennas 31 and a second row of three receiving antennas 31 on a three row sensor. A signal is generated via a signal source on a PCB and conducted via a lead wire to a contact point. Two conductors ohmically connected to the contact point conduct the signal, one going to the body, and the other going to the isolation antenna 32. In the illustrative embodiment, only the three receiving antennas 31 in the isolated row (i.e., the row alone on one side of the isolation antenna 32) are connected to a receiving antenna 31 and signal processor via a lead wire. When the infusion signal is connected to the isolation antenna 32 and the body, the effect of fingers on the other side of is substantially mitigated. In an embodiment, receiving antennas 31 on both sides of the isolation antenna 32 are connected to a signal processor via its own lead wire. In an embodiment, isolation antennas 32 are placed between each row of receiving antennas 31.

Figure 4:
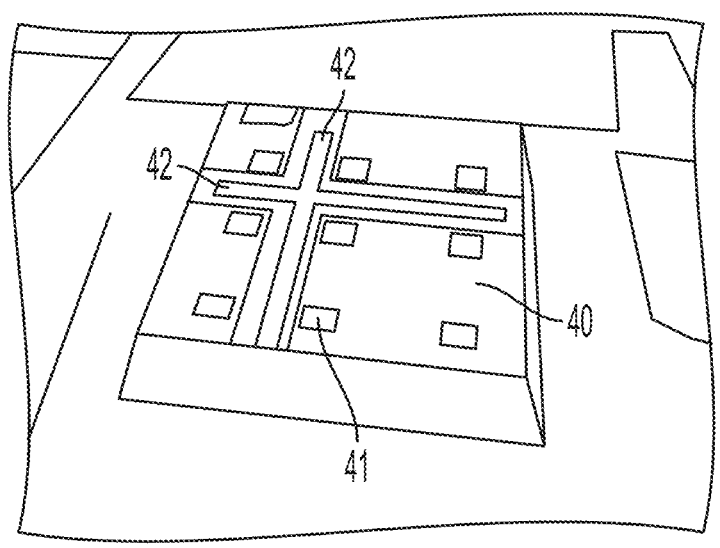
FIG. 4 shows an embodiment of L isolation.

Turning to FIG. 4, shown is an exemplary embodiment of a sensor 40 using multiple isolation antennas 42. Isolation antennas 42 are placed on a sensor 40 employing three rows of three receiving antennas 41 each. In this embodiment, one isolation antenna 42 is run between the first and second rows of receiving antennas 41, while a second isolation antenna 42 is in ohmic contact with the first, is run between the first and second receiving antennas 41 in each of the rows. Using this test configuration, when the infusion signal is connected to the isolators and the body, the effect of a probe (e.g., a finger) on one side of an isolation antenna 42 is mitigated with respect to receiving antennas on the other side of the isolation antenna 42.

Figure 5:
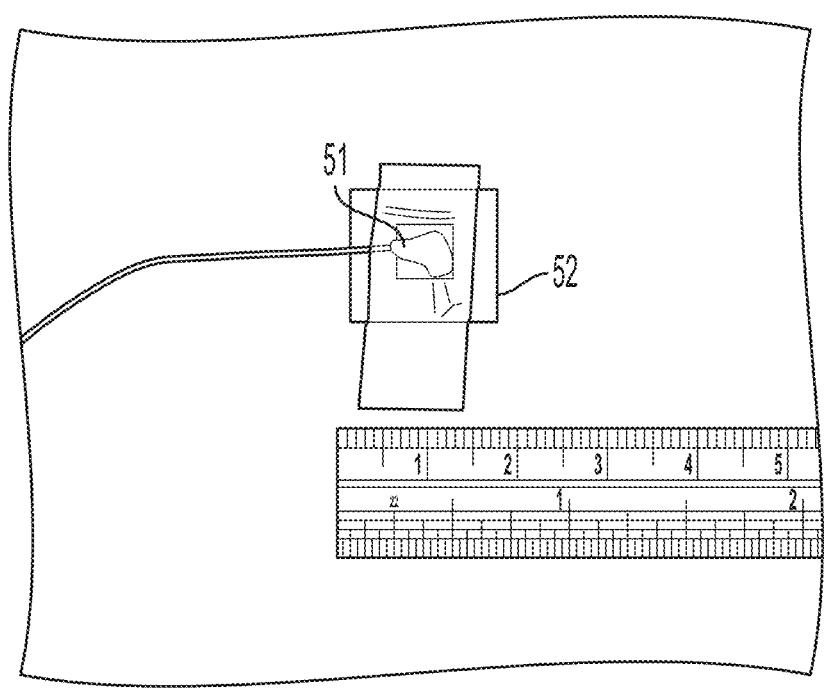
FIG. 5 shows an embodiment of box isolation.
Figure 6:
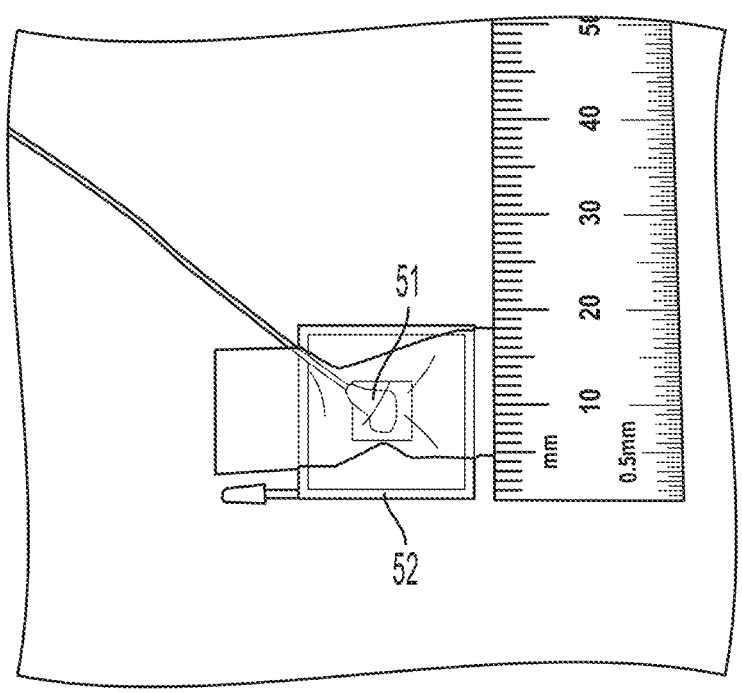
FIG. 6 shows another embodiment of box isolation.

Turning now to FIGS. 5 and 6, shown are embodiments of isolation antennas 52 that are rectangular shaped. In FIGS. 5 and 6, a receiving antenna 51 is surrounded by an isolation antenna 52 that is forming a rectangle. It will be apparent to a person of skill in the art in view of this disclosure that the configurations, and the size of the receiving antennas 51, isolation antennas 52 and the spacing between them may be varied. As above, signals at the isolated receiving antenna 51 that results from fingers beyond the isolation antenna 52 are substantially mitigated and/or masked by the isolation antenna 52, while fingers close to a receiving antenna 51 still cause a change in the received signal behavior.

In an embodiment, no infusion signal is used. For example, returning to FIG. 3, where there is an isolation antenna 32 on a sensor 30 employing three rows of three receiving antennas 31 each. When an infusion signal is connected to the isolation antenna 32, but not to a body, the effect of fingers on the other side of the isolation antenna 32 is substantially mitigated. Although the magnitude of the response is reduced, the effect of the isolation antenna 32 is still present and measurable.

While FIGS. 3-6 each show different geometries used for isolation antennas, such as a line, an L shape, and a rectangular shape, many more geometries will be apparent to a person of skill in the art in view of this disclosure. Because the illustrated transmitting/isolation antenna geometries demonstrate the variation of three design parameters: width, closure, and adjacency to receiving antenna. The parameter of closure describes whether an isolation antenna fully encloses a receiving antenna, such as the rectangle shaped isolation antenna, or only antennas a subset of the edges of the receive, such as line and L shaped. As an isolation antenna increases in its width and is more closely adjacent to a receiving antenna, it will contribute a greater amount of signal strength to the receiving antenna. Levels of isolation can be varied to achieve desired results by adjusting these design parameters.

For example, a rectangle geometry with a width of 5 mm (see, e.g., FIG. 5) and an adjacency of 1 mm or 5 mm will fully isolate a signal. However, a rectangle geometry with a width of 1 mm and an adjacency of 5 mm (see, e.g., FIG. 6) will see an approximately 15% signal increase when a finger is placed outside the rectangular shaped isolation antenna. In an embodiment, adjacency of 3 mm and a width of 3 mm is useful to isolate signal response while balancing demands on a physical sensor space. Any size receiving antenna may be used. In an embodiment, a receiving antenna may be as small as 1 mm rectangle or less, or much larger. A receiving antenna having 36 mm square surface can perform adequately, as will a receiving antenna be having only 9 mm square surface. As discussed further below, receiving antennas may be grouped together to increase effect. Closure can also be increased to improve isolation, for example, a rectangular geometry will produce greater isolation than a having a line shaped isolation antenna.

Figure 7:
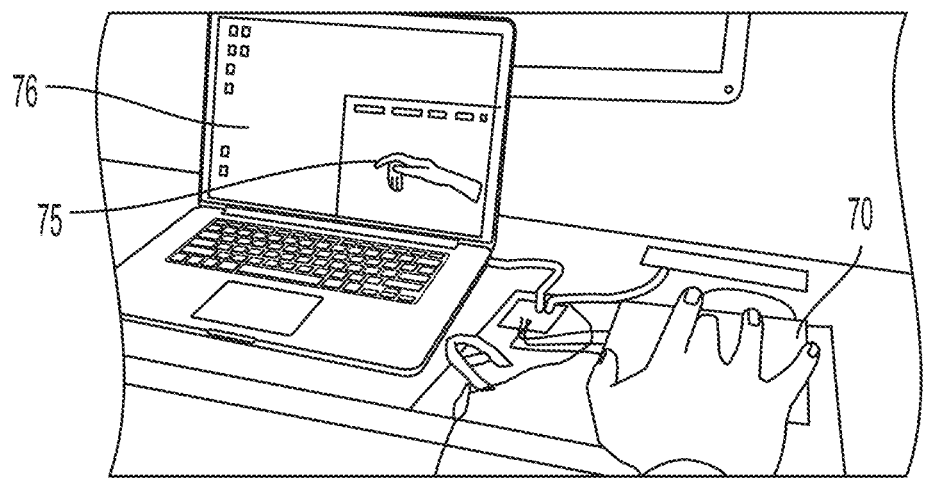
FIG. 7 shows a test configuration demonstrating the effect of fingers on a sensor without isolation.

FIG. 7 illustrates interference that occurs on the test setup shown in FIG. 3 when an isolation antenna is not used. In the test setup similar to that shown in FIG. 3, only one row of receiving antennas is employed, and that row corresponds to the pointer finger in the hand above the sensor 70 shown in FIG. 7. Moreover, in the illustrated test setup, only the pointer finger is being reconstructed based on input from the sensor 70. Although the pointer finger is substantially straight in the actual hand above the sensor 70, the reconstructed pointer finger 75 on the screen 76 shows that it is bent. The imperfect reproduction of the finger position is the result from interference caused by the movement of the middle finger towards the sensor 70, albeit above its own row.

Figure 8:
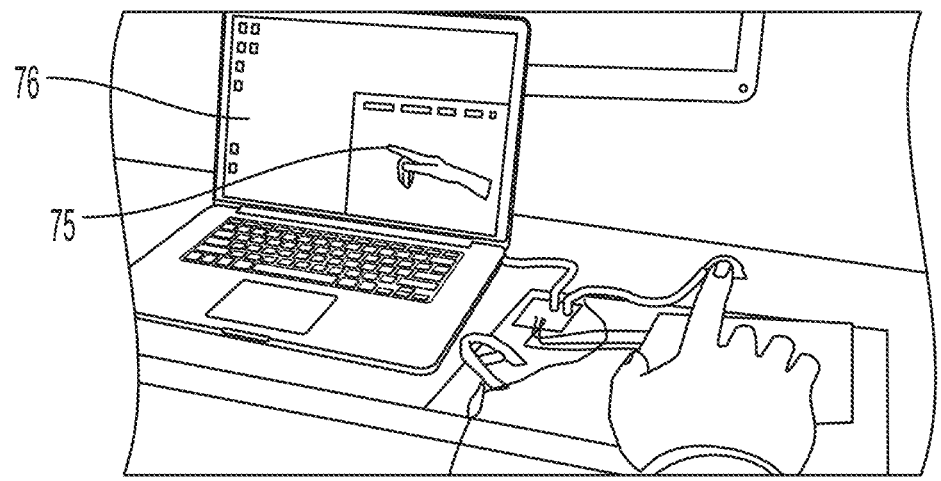
FIG. 8 shows a test configuration demonstrating the isolation effect from fingers on a sensor with an isolator.
Figure 9:
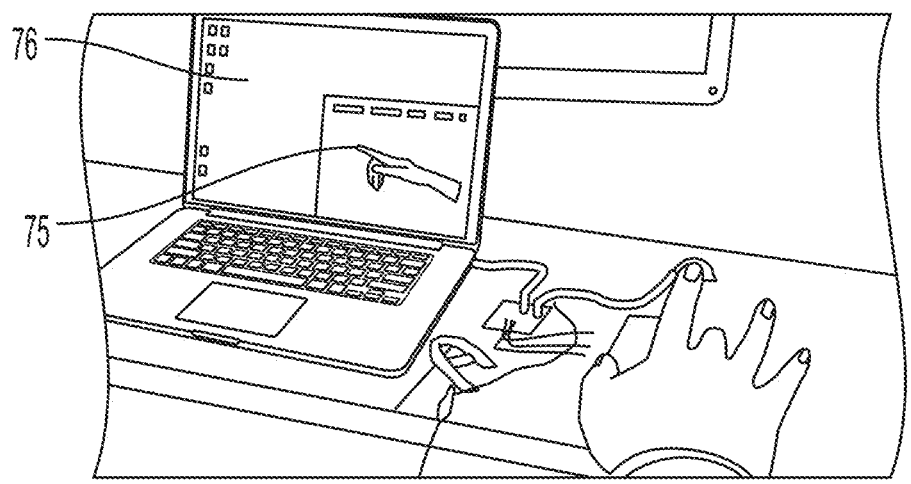
FIG. 9 shows another view of a test configuration demonstrating the isolation effect from fingers on a sensor with an isolator.

For FIGS. 8 and 9, the test setup remains the same as that used in FIG. 7, except that the isolation antenna is infused with the same frequency as that which is used by the body (and thus, the hand). The fingers to the right of the isolation antenna do not affect the finger reconstruction of the finger to the left of the isolation antenna. As such the reconstructed pointed finger 75 shown on the screen 76 is closer to the actual position of the pointer finger.

Antennas often have static characteristics. For example, antennas may have fixed surface areas. Antennas may also have fixed functional roles (i.e. transmitting, receiving, ground). However, it is possible to vary the characteristics of antennas in real-time so as to dynamically adjust the behavior of a sensor.

In addition to surface area, the behavior of each antenna can be changed in real-time to programmatically alter sensor design. For example, given a matrix of N×M antennas, each antenna having a square geometry of 5×5 mm, the behavior of each antenna can be dynamically designated as a transmitting or receiving antenna. Moreover, given the receiving antenna isolation method discussed previously, some antennas can be designated as infusion transmitting antennas (e.g., isolators) to isolate the response volume of a given receiving antenna. Similarly, some antennas could be grounded to reduce the response of nearby receiving antennas.

Beyond functional identity, the surface area of the sensor can be programmed as well. For example, a parallel plate capacitor model demonstrates that capacitance will increase as the surface area of a plate increases. For example, given a matrix of square antennas, each with a surface area of 5×5 mm, and a set of physical switches between each antenna, it is possible to dynamically change an antenna's functional surface area. Combinations of these square antennas can be connected using their switches. For example, in an embodiment, a group of two antenna can be connected to produce a surface area of 50 mm² (i.e. 5×10 mm). In an embodiment, a group of four antennas can be connected to form a 100 mm² area (i.e. 10×10 mm), and so on. Of course, the 5×5 size is just illustrative, and this principle would be equally applicable to smaller and larger arrays of antenna.

For example, in an embodiment, when using a grip controller, the role of each antenna can be updated to reflect a new position of a hand or finger. If a hand position changes relative to a controller's surface, antennas that were previously transmitting antennas could be designated as receiving antennas to ensure a more localized view of a finger.

Early testing has been performed to characterize the isolation response for the design parameters discussed above. A subset of conditions were tested according to the following independent variables: adjacency (1 mm, 5 mm)× closure (short line, long line, rectangle)×width (1 mm, 5 mm)×finger_contact (unconnected, distant, nearby, contact). Note, the presence of isolation (i.e. strip enabled or disabled) was ignored in this experiment, as a difference in signal behavior was observed in earlier tests and not of interest.

The dependent variable is the percentile difference between the mean signal strength of finger_contact distant and finger_contact nearby. This formulation means that a receiving antenna that is completely isolated should not see a contribution from a finger when it is beyond the isolation strip and "distant" to the receiving antenna. The percentile difference should be 0% when a receiving antenna is isolated.

It is believed that: increasing closure will increase isolation; increasing width will increase isolation; increasing adjacency will increase isolation. The preliminary experimental data supports the hypotheses and is summarized in the table below. In an embodiment, although adjacency is a useful parameter to increases isolation, placing the isolation antenna (i.e. transmitting antenna) will impact the sensitivity of the receiving antenna. An isolation antenna with 1 mm adjacency will produce a greater contribution on a nearby receiving antenna compared to an antenna that is 5 mm away.

| Condition | Adjacency | Width | Closure | % Difference | Comment |
| --- | --- | --- | --- | --- | --- |
| 1 | 1 mm | 5 mm | Long (50 mm) | 6% | Higher isolation due to adjacency |
| 2 | 5 mm | 5 mm | Long (50 mm) | 20% | |
| 3 | 1 mm | 5mm | Short (30 mm) | 7% | Higher isolation due to adjacency |
| 4 | 5 mm | 5 mm | Short (30 mm) | 12% | |
| 5 | 1 mm | 5 mm | Box | 0% | Box closure leads to higher isolation |
| 6 | 5 mm | 5 mm | Box | 0% | |
| 7 | 1 mm | 1 mm | Short (30 mm) | 13% | Less isolation due to smaller width |
| 8 | 5 mm | 1 mm | Short (30 mm) | 36% | Less isolation due to smaller width and higher adjacency |
| 9 | 5 mm | 1 mm | Box | 10% | More isolation than other 1 mm widths |

Figure 10:
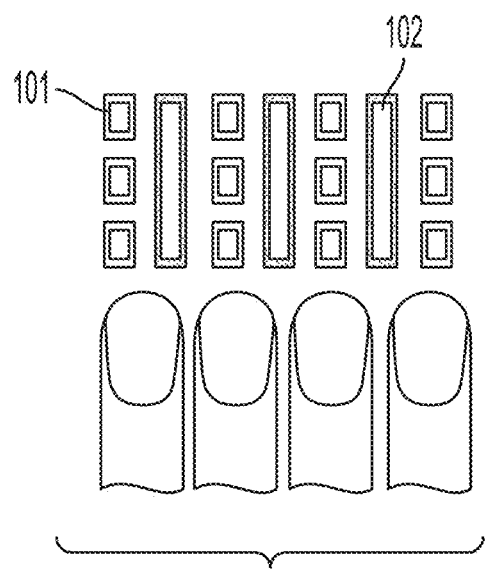
FIG. 10 shows an array of sensor elements in accordance with one embodiment of the disclosure.

Turning to FIG. 10, a sensor array is shown having an illustrative array of 4 columns of 3 antennas 101 and an isolator antenna 102 between each column. At the bottom of FIG. 10, four fingers are shown for scale. In an embodiment, fingers can be tracked along their length by using the antennas 101 as receiving antennas, and the isolator antennas 102 as isolators. In an embodiment, the isolator antennas 102 share a common signal with an infusion signal that is applied to the body. In an embodiment, the isolator antennas 102 share a common signal with an infusion signal that is applied to the body, and additionally, each have another orthogonal signal that can be detected by decoding the information received at the receiving antennas. In an embodiment, each of the another orthogonal signals differ from each other such that each transmitting antenna transmits one unique signal and one another signal (e.g., the isolation signal) that is common to all.

Figure 11:
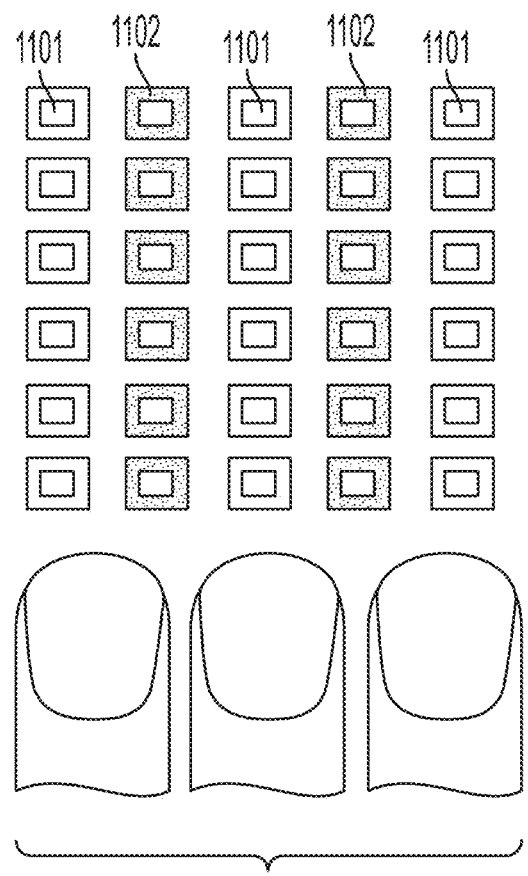
FIG. 11 shows an array of sensor elements in accordance with another embodiment of the disclosure.

Turning to FIG. 11, a sensor is shown having an illustrative array of 5 columns of 6 antennas each, first antennas 1101 and second antennas 1102. At the bottom of the three columns are three fingers shown for scale. In an embodiment, fingers can be tracked along their length by using the first antennas 1101 as receiving antennas, and the second antennas 1102 as isolators. In an embodiment, the second antennas 1102 share a common signal with an infusion signal that is applied to the body. In an embodiment, the second antennas 1102 share a common signal with an infusion signal that is applied to the body, and additionally, each have another orthogonal signal that can be detected by decoding the information received at the receiving antennas. In an embodiment, each of the another orthogonal signals differ from each other such that each transmitting antenna transmits one unique signal and one another signal (e.g., the isolation signal) that is common to all. In an embodiment, the another signal is not transmitted by adjacent transmitting antennas, but may be common to multiple transmitting antennas, e.g., every other one, or every third one.

Figure 12:
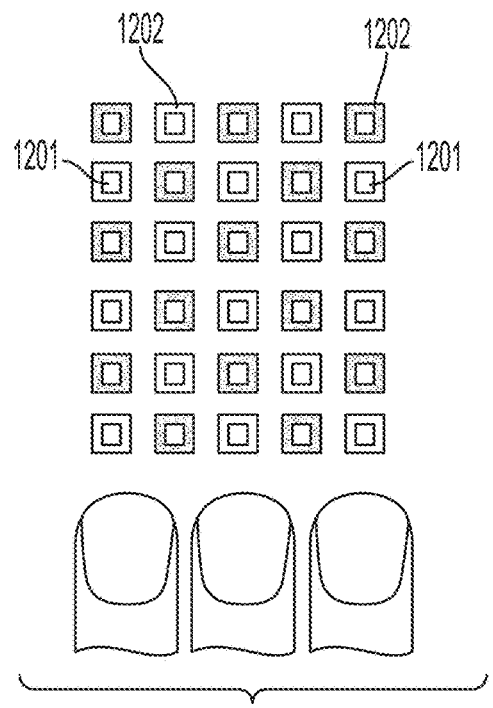
FIG. 12 shows an array of sensor elements in accordance with yet another embodiment of the disclosure.

Turning to FIG. 12, another illustrative sensor array is shown. Again, a finger tip is shown for scale. In an embodiment, the first antennas 1201 are receiving antennas and the second antennas 1202 are transmitting antennas, and thus can provide isolation between the receiving antennas. In an embodiment, each of the first antennas 1201 and the second antennas 1202 may operate as either a receiving antenna or transmitting antenna. As above, in an embodiment, each of the second antennas 1202 are transmitting antennas that carry the isolation signal. In an embodiment, each of the second antennas 1202 are transmitting antennas that may carry one or more additional signals that are orthogonal from the isolation signal. In an embodiment, no isolation signal is used, and each of the second antennas 1202 are transmitting antennas that carry one or more signals that are orthogonal to each signal carried by each other second antenna 1202 functioning as a transmitting antenna in the array. Each first antenna 1201 (or second antenna 1202) functioning as a receiving antenna is operatively coupled to a signal processor to process the signals received thereon. Because each of the first antennas 1201 and second antennas 1202 can act as a transmitting antenna or receiving antenna, as discussed above, in an embodiment, the array can be reconfigured which may assist in emulating an effectively larger receiving antenna or transmitting antenna. In an embodiment, programmable physical connections (e.g., switches) can be employed to effectively change the surface area of an element (and thus its sensitivity) by connecting multiple of them together to act as one.

Figure 13:
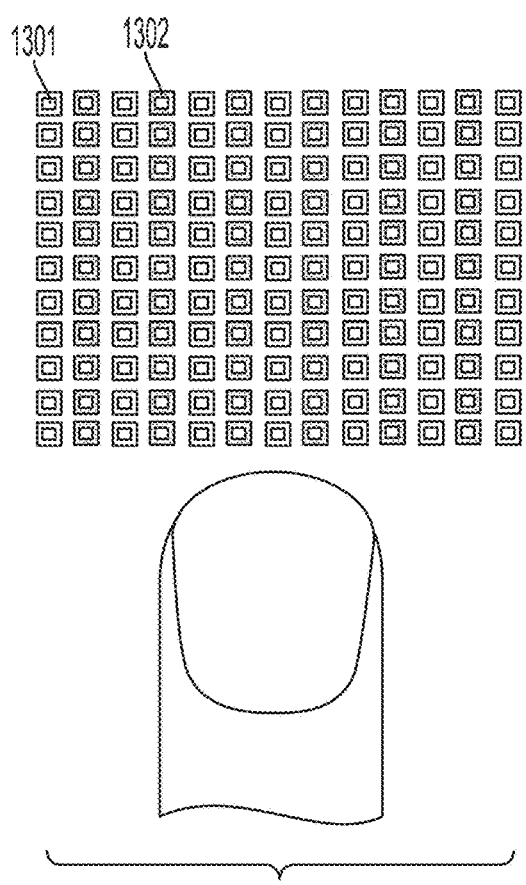
FIG. 13 shows an array of sensor elements in accordance with a further embodiment of the disclosure.

Turning to FIG. 13, another illustrative sensor array is shown. Again, a finger tip is shown for scale. In an embodiment, the first antennas 1301 are receiving antennas and the second antennas 1302 are transmitting antennas, and thus can provide isolation between the first antennas 1301 functioning as receiving antennas. In an embodiment, each of the first antennas 1301 and the second antennas 1302 may operate as either a receiving antenna or transmitting antenna. As above, in an embodiment, each second antenna 1302 functioning as a transmitting antenna carries the isolation signal. In an embodiment, each second antenna 1302 functioning as a transmitting antenna may carry one or more additional signals that are orthogonal from the isolation signal. In an embodiment, no isolation signal is used, and each of the second antennas 1302 functioning as transmitting antennas carries one or more signals that are orthogonal to each signal carried by each other second antenna 1302 functioning as a transmitting antenna in the array. Each first antenna 1301 functioning as a receiving antenna is operatively coupled to a signal processor to process the signals received thereon. As discussed above, in an embodiment, the array can be reconfigured to have effectively larger receiving antennas or transmitting antennas.

Figure 14:
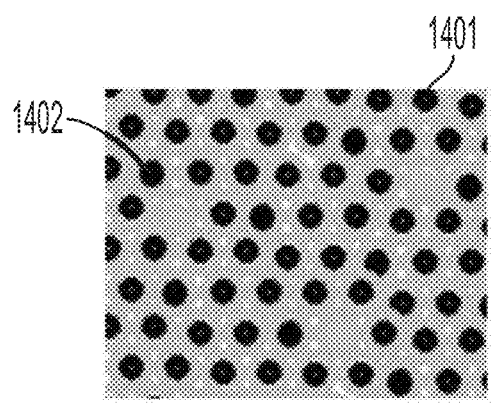
FIG. 14 shows an array of sensor elements in accordance with yet a further embodiment of the disclosure.

Turning to FIG. 14, an illustrative portion of a dense array of first antennas 1401 and second antennas are shown. In an embodiment, the first antennas 1401 and the second antennas 1402 may be used as receiving antennas, transmitting antennas and/or ground.

Figure 15:
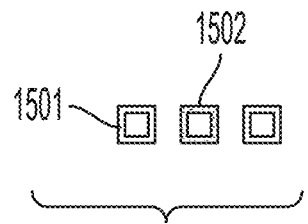
FIG. 15 shows an array of sensor elements in accordance with an even further embodiment of the disclosure.
Figure 16:
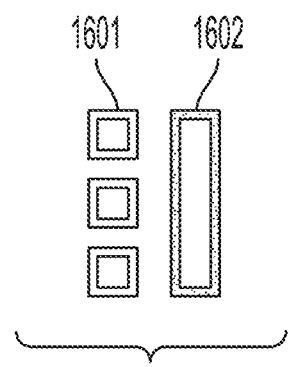
FIG. 16 shows an array of sensor elements in accordance with an even further embodiment of the disclosure.
Figure 17:
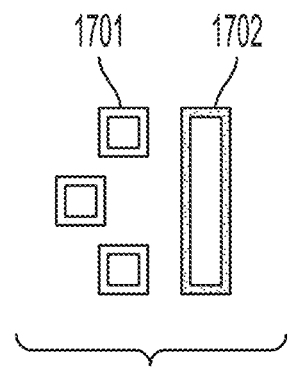
FIG. 17 shows an array of sensor elements in accordance with an even further embodiment of the disclosure.

FIGS. 15-17 show various sensor arrays of antennas. FIG. 15 has an array of first antennas 1501 and a second antenna 1502. The first antennas 1501 and the second antenna 1502 may function as transmitting antennas and receiving antennas. When functioning as a transmitting antenna, the second antenna 1502 may be an isolation transmitting antenna, thereby reducing interference that may occur at the first antennas functioning as receiving antennas.

FIG. 16 has an array of first antennas 1601 and a second antenna 1602. The first antennas 1601 and the second antenna 1602 may function as transmitting antennas and receiving antennas. When functioning as a transmitting antenna, the second antenna 1502 may be an isolation transmitting antenna, thereby reducing interference that may occur at the first antennas functioning as receiving antennas.

FIG. 17 has an array of first antennas 1701 and a second antenna 1702. The first antennas 1701 and the second antenna 1702 may function as transmitting antennas and receiving antennas. When functioning as a transmitting antennas, the second antenna 1702 may be an isolation transmitting antenna, thereby reducing interference that may occur at the first antennas functioning as receiving antennas.

Figure 18:
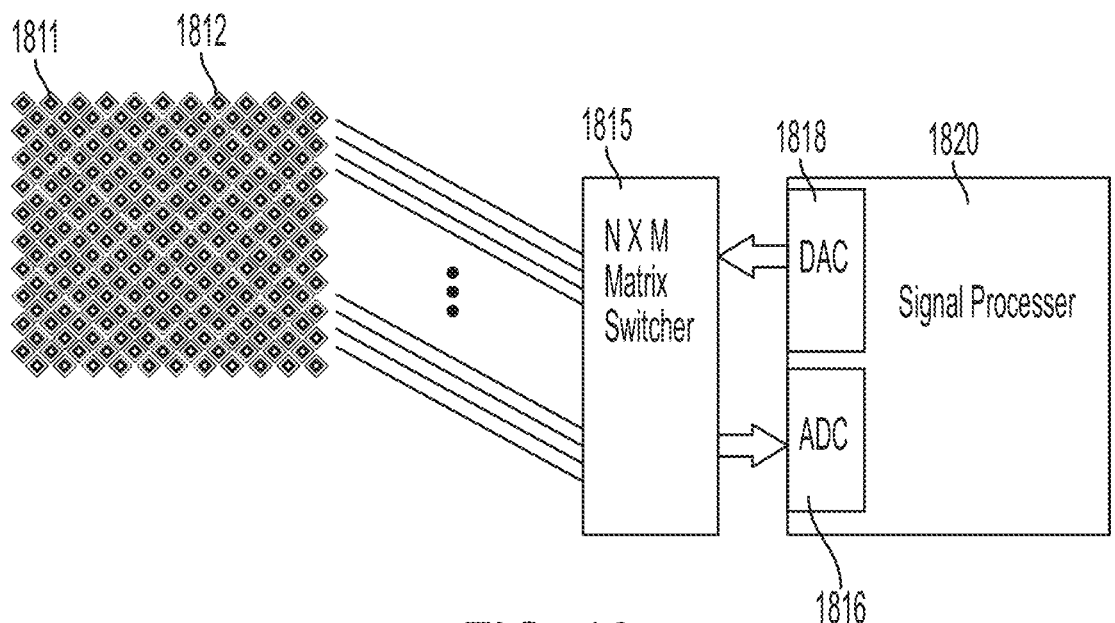
FIG. 18 shows an exemplary embodiment of a hover sensor in accordance with an embodiment of the disclosure.

FIG. 18 shows an embodiment comprising a dense array of antennas, such as first antenna 1801 and second antenna 1802, each of the antennas may be individually connected to an N×M switcher 1815 that will switch any input to any output. The N×M switcher 1815 may then be connected to an analog to digital (ADC) input 1816 and digital to analog output 1818 (DAC) operably connected to a signal processor 1820 on a touch sensor chip which is configured to generate and transmit the required orthogonal signals, and to receive and process incoming signals. In this configuration, any of the antennas, such as first antenna 1801 and second antenna 1802, can be used individually or can be combined with others. Similarly each antenna, such as first antenna 1801 and second antenna 1802, can act as a receiving antenna or as a transmitting antenna. In an embodiment, groups of elements are used together to form larger receiving antennas to detect faint or distant signals, and the element groups are reduced in surface area (ultimately down to 1 element) to detect closer signals. In an embodiment, each of the antennas, such as first antenna 1801 and second antenna 1802, may be used as a receiving antenna, a transmitting antenna or a ground.

Figure 19:
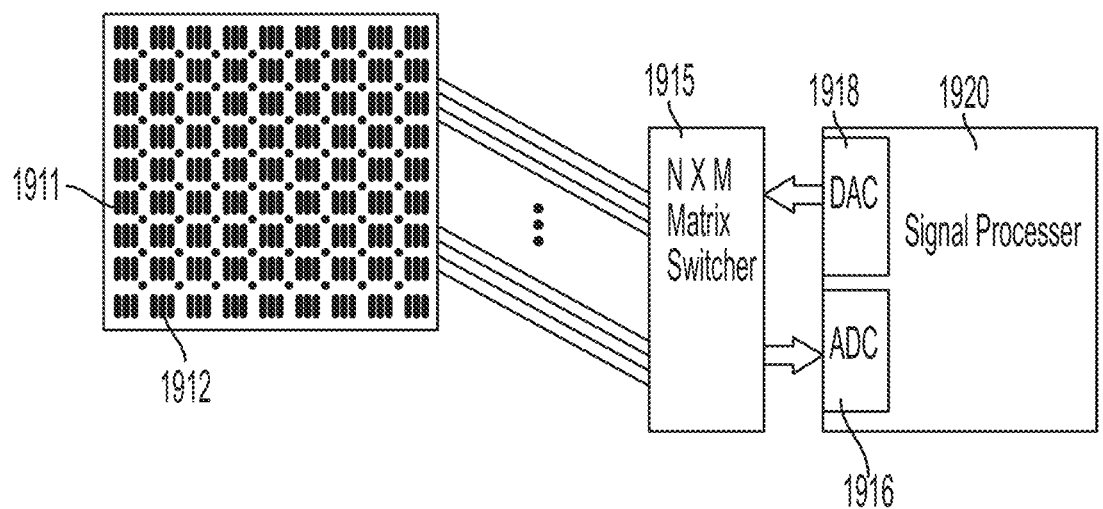
FIG. 19 shows an exemplary embodiment of an OLED panel with hover sensor array in accordance with an even further embodiment of the disclosure.

FIG. 19 shows an embodiment comprising an array of antennas, such as first antenna 1901 and second antenna 1902, each individually connected to a N×M switcher 1915 that will switch any input to any output. In FIG. 19, the antennas, such as the first antenna 1901 and the second antenna 1902, are interspersed with other components. In an embodiment, the antennas, such as first antenna 1901 and second antenna 1902, are interspersed with OLED components on an OLED display. As above, the N×M switcher 1915 is then connected to an analog to digital (ADC) input 1916 and digital to analog output 1918 (DAC) operably connected to a signal processor 1920 which is configured to generate and transmit the required orthogonal signals, and to receive and process incoming signals. In this configuration, any of the antennas can be used individually or can be combined with others.

Figure 20:
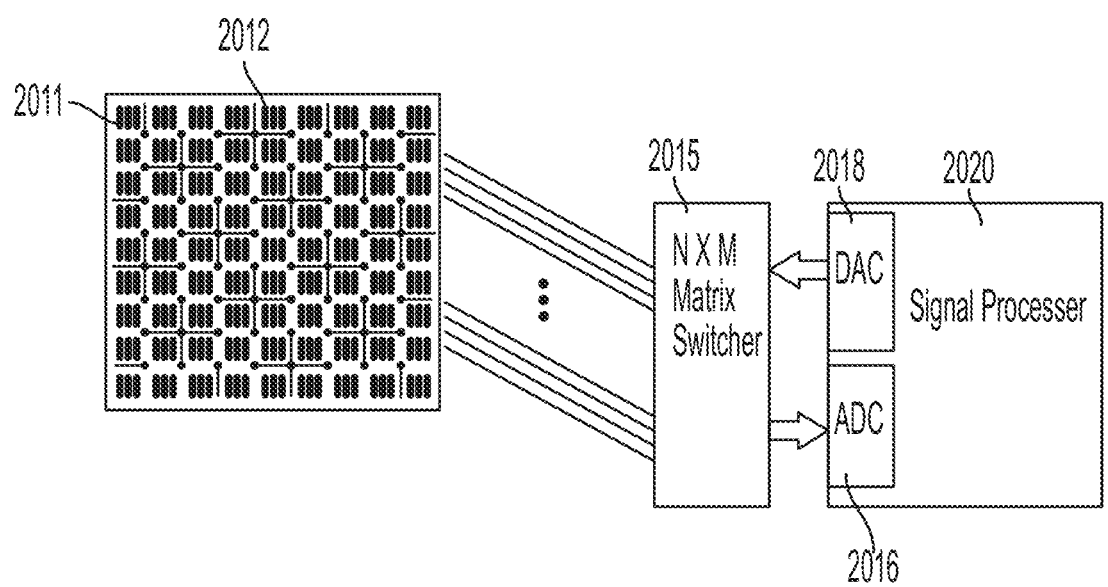
FIG. 20 shows another exemplary embodiment of an OLED panel with hover sensor array in accordance with yet another embodiment of the disclosure.

Because the scale of an OLED may require antennas that are too small or inefficient to be practical, in an embodiment, antennas may be larger. Turning to FIG. 20, shown is an embodiment comprising an array of antennas, such as first antenna 2001 and second antenna 2002, each individually connected to a N×M switcher 2015 that will switch any input to any output. In FIG. 20, the antennas, such as the first antenna 2001 and the second antenna 2002, are interspersed with other components. In an embodiment, the antennas, such as first antenna 2001 and second antenna 2002, are interspersed with OLED components on an OLED display. As above, the N×M switcher 2015 is then connected to an analog to digital (ADC) input 2016 and digital to analog output 2018 (DAC) operably connected to a signal processor 2020 which is configured to generate and transmit the required orthogonal signals, and to receive and process incoming signals. In this configuration, any of the antennas can be used individually or can be combined with others. Substantially larger antennas, made of first antennas 2001 and second antennas 2002, are provided in a similar OLED configuration.

In an embodiment, the antennas may be laid out on a single layer; e.g., a layer of flexible material. In an embodiment, the antennas may be laid out on multiple layers; e.g., on one or two sides of one or more pieces of flexible material. In an embodiment, some or all of the antennas and some conductors may be laid out on the same layer, while other conductors and any remaining antennas are on a separate layer (e.g., separate substrate or separate side of the same substrate). In an embodiment, the antennas or conductors (the terms antenna and conductor may be used interchangeably) may be embedded into a substrate, e.g., plastic, cloth or rubber. In an embodiment, the antennas or conductors may be placed on the surface of a substrate, e.g., plastic, cloth or rubber. In an embodiment, some antennas or conductors are embedded into a substrate while others are on the surface of the substrate. In an embodiment, the antennas or conductors are deployed on a flexible substrate. In an embodiment, the antennas or conductors are deployed on a flexible substrate so that deformation and changes in the relative orientation of the substrate can be detected.

Figure 21:
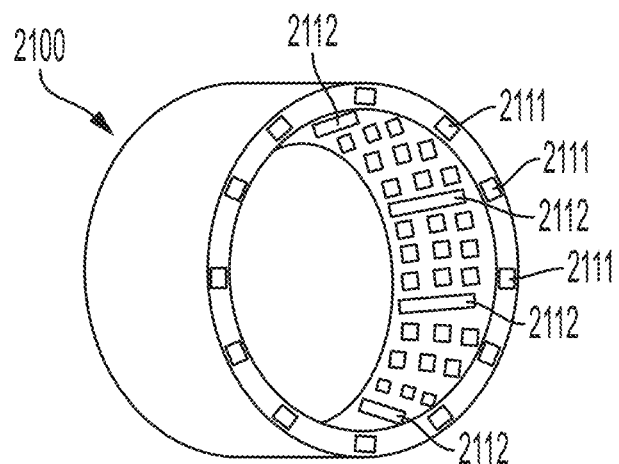
FIG. 21 illustrates a band having sensor elements in accordance with an embodiment of the disclosure.

Turning to FIG. 21, a band 2100 is shown according to an embodiment. In an embodiment, the band 2100 is flexible. In an embodiment, the band 2100 is designed to be worn on the body. In an embodiment, the band 2100 is designed to be worn around the wrist or palm. In an embodiment, the band 2100 is designed to be worn around the neck, leg, ankle, arm, chest, or other parts of the body. In an embodiment, the band 2100 is incorporated into a wearable article (e.g., shirt, pants, undergarments, gloves). In an embodiment, the band 2100 has an inner portion and an outer portion. In an embodiment, the band 2100 has an inner portion, an outer portion and an edge.

In an embodiment, antennas, such as first antenna 2111 and second element 2112, are placed on the inner portion of the band 2100. In an embodiment, antennas, such as first antenna 2111 and second antenna 2112, are placed on the inside surface may be configured as transmitting antenna or receiving antenna. In an embodiment, isolators, which may be elongated antennas that are functioning as isolators, are deployed between one or more groups of other antennas. In an embodiment, the antennas and antennas functioning as isolators, located on the inner portion of the band are configured to be in ohmic contact with the skin when the band 2100 is worn. In an embodiment, the antennas and antennas functioning as isolators, located on the inner portion of the band 2100 are configured not to be in ohmic contact with the skin, but rather close to the skin, when the band 2100 is worn. In an embodiment, the antennas and antennas functioning as isolators, located on the inner portion of the band 2100 are configured to be at a distance from the skin when the band 2100 is worn. In an embodiment, a dielectric material is between the skin, and the antennas and antennas functioning as isolators.

In an embodiment, antennas, such as the first antenna 2111 and second antenna 2112, are placed at the edge and/or on the outside surface (not shown). Antennas placed on the edge and/or the outside surface may be configured as receiving antennas and utilized as signal infusion receiving antennas. Antennas placed on the edge and/or the outside surface may be configured as transmitting antennas and may be used as described here for isolation or to create fields between the transmitting antenna and a receiving antenna that can be used to detect touch/hover.

In an embodiment, using a matrix of antennas functioning as N×M matrix of transmitting antennas and receiving antennas affixed to a deformable substrate, the shape of the substrate may be modeled as a function of the relative distance and/or orientation between these transmitting antennas and receiving antennas. In an embodiment, compression, extension, or other surface deformations cause the orientation between antennas to change. In an embodiment, compression, extension, or other surface deformations cause the distance between antennas to change. In an embodiment, the distance and/or orientation between antennas may change due to strain or other force introduced to the substrate.

Returning to FIGS. 12, 13 and 14, for example, global extension along a horizontal axis will change the distance and/or orientation between first antennas 1211, 1311, 1411 and second antennas 1212, 1312, 1412. Similarly, local deformations (i.e. protrusions) will produce a change in orientation between first antennas 1211, 1311, 1411 and second antennas 1212, 1312, 1412. In an embodiment, local deformations will cause changes in antenna orientation. In an embodiment, where the placement of the antenna pattern and substrate properties (e.g. elastic modulus) are known (or can be estimated), signal changes produced by varied antenna orientation can serve as basis for measurements to model surface deformation and shape.

In an embodiment, changes in skin deformation during finger articulation and hand movement can be sensed as relative orientation changes between antennas in a band worn on the wrist or the palm. In an embodiment, the antennas can be layered changing the reference orientation of the deformable surface receiving antennas and transmitting antennas with the skin, allowing to model different levels of deformations of the skin resulting on the characterization of the motion of the hand and fingers.

Figure 22:
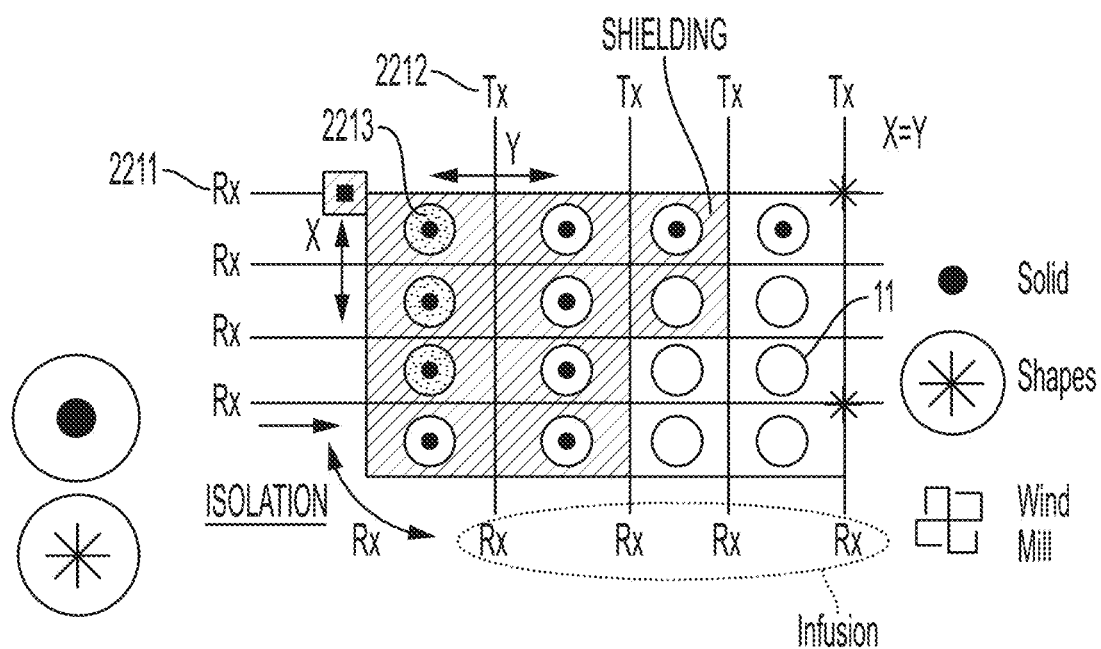
FIG. 22 is a high level schematic diagram of a sensor configuration in accordance with one embodiment of the disclosure.

Turning to FIG. 22, a high level schematic diagram of a sensor configuration in accordance with one embodiment of the invention is shown. Shown are a plurality of row conductors 2211 and a plurality of column conductors, with antennas 2213 interspersed between the plurality of row conductors 2211 and the plurality of column conductors 2212. In an embodiment, a plurality of antennas 2213 that may be shielded are interspersed in a matrix of the plurality of row conductors 2211 and the plurality of column conductors 2212. In an embodiment, each of the antennas 2213, which may be shielded, may be used as transmitting antennas, receiving antennas or ground. In an embodiment, shielding, when used, may be planar or, for example, boxed in by a rectangular isolation antenna, such as shown in FIG. 5. In an embodiment, orthogonal groups of the matrix of conductors are used as receiving antennas and transmitting antennas respectively. In an embodiment, the conductors that are transmitting may be used for isolation (e.g., for isolating receiving antennas with respect to an infusion signal), and may vary in width. In an embodiment, the matrix of conductors includes conductors that receive on one axis, and conductors that both receive and transmit on another. In an embodiment, the matrix of conductors includes conductors that receive and transmit on each axis.

Figure 23:
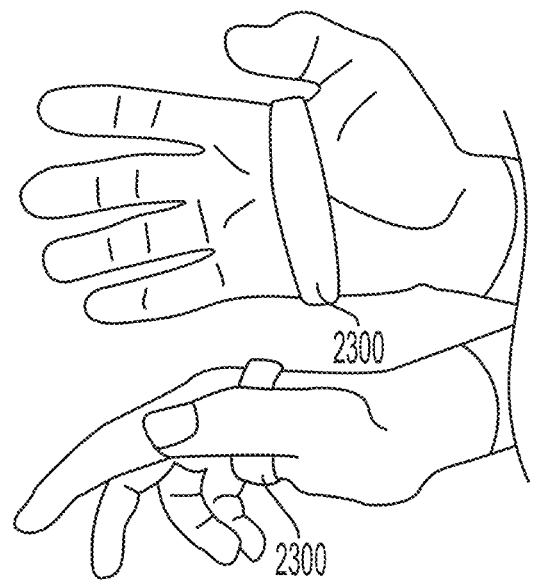
FIG. 23 shows views of a band incorporating a sensor in accordance with one embodiment of the disclosure.
Figure 24:
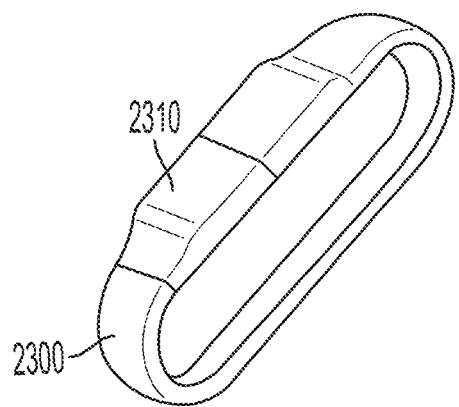
FIG. 24 shows another view of the band incorporating the sensor in accordance with an embodiment of the disclosure.
Figure 25:
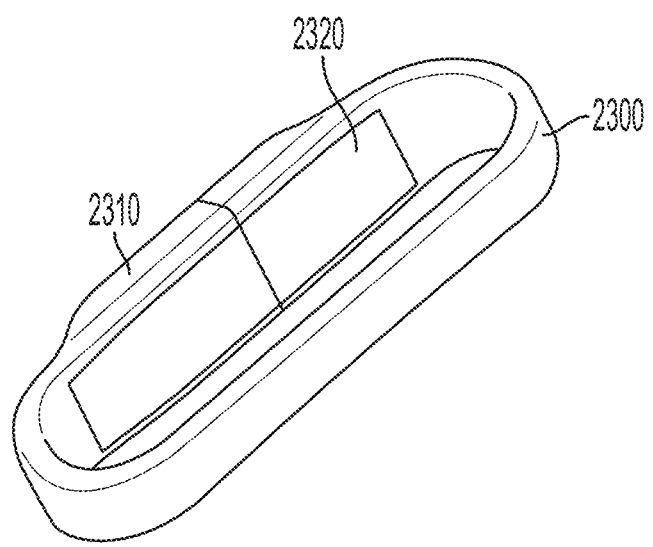
FIG. 25 shows another view of the band incorporating the sensor in accordance with an embodiment of the disclosure.

FIGS. 23-25 show various views of a band 2300 incorporating a sensor in accordance with an embodiment. In an embodiment, as illustrated various sensing areas may be present. For example, in FIG. 24, the top portion 2310 of the band 2300 may include receiving or transmitting antennas. In FIG. 25 an interior portion 2320 may include receiving or transmitting antennas. In an embodiment, both the interior portion 2320 and the top portion 2310 may include receiving or transmitting antennas. In an embodiment the interior portion 2320 may include an infusion transmitting antenna.

Figure 26:
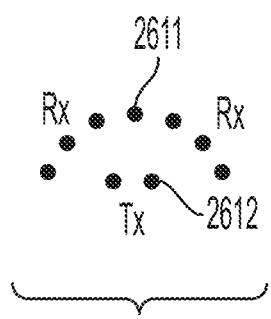
FIG. 26 shows a plurality of receiving lines arranged with lines perpendicular to the finger plane of motion.

FIG. 26 illustrates an embodiment employing geometric separation between antennas. Shown in the embodiment, (in side view) there is a dome of antennas that are first antennas 2611 that are functioning as receiving antennas over the top of one or more antennas that are second antennas 2612 that are functioning as transmitting antenna. In a traditional capacitive sensor, a matrix is formed from row conductors that transmit signals and column conductors that receive signals and "touch" is detected from interaction at the nodes (i.e., where a row conductor and column conductor cross). In an embodiment, first antennas 2611 and second antennas 2612 function as receiving antennas and transmitting antennas and run in parallel. The multiple first antennas 2611 functioning as receiving antennas interact with each of the second antennas 2612 functioning as transmitting antennas. In the embodiment shown in FIG. 26 the first antennas form a dome over the second antennas 2612. In an embodiment, the first antennas surround the second antennas. In an embodiment, the first antennas and the second antennas are randomly distributed with respect to each other.

Figure 27:
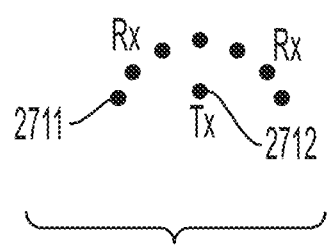
FIG. 27 shows a plurality of receiving lines and an infusion source.

Referring to FIG. 27, in an embodiment, antennas that are first antennas 2711 and second antenna 2712 function as receiving antennas and a transmitting antenna and run in parallel (FIG. 27 is showing a side view of the first antennas 2711 and the second antenna 2712). The multiple first antennas 2711 functioning as receiving antennas interact with the second antenna 2712 functioning as a transmitting antenna. In an embodiment, the first antennas surround the second antenna. In an embodiment, the first antennas and the second antennas are randomly distributed with respect to each other.

In an embodiment, antennas, such as the first antennas and the second antennas, function as receiving and transmitting dots that are disbursed. In an embodiment, an antenna that is a disbursed dot receiving antenna interacts with antennas that are multiple dot transmitting antennas. In an embodiment, antennas that are multiple dispersed dot receiving antennas interact with an antenna that is a dot transmitting antenna. In an embodiment, antennas that are multiple dispersed dot receiving antennas interact with antennas that are multiple dispersed dot transmitting antennas. In an embodiment, antennas that are dot receiving antennas are used with antennas that are transmitting conductors; and in an embodiment, antennas that are dot transmitting antennas are used with antennas that are receiving conductors.

Figure 28:
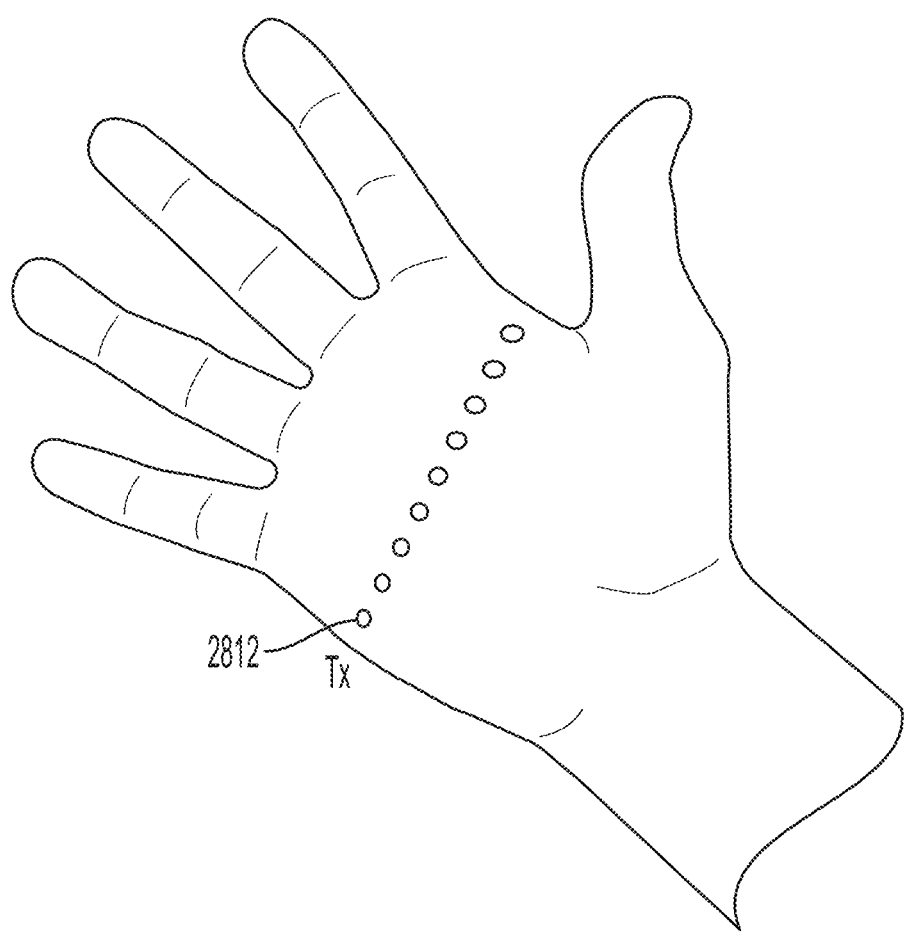
FIG. 28 shows a hand with transmitting antennas placed thereon.

FIG. 28 shows a hand with transmitting antennas 2812 placed thereon. Located elsewhere may be receiving antennas that are able to receive signals transmitted from the transmitting antennas 2812. In an embodiment, the receiving antennas are located on the same hand. In an embodiment, the receiving antennas are located on the other hand. In an embodiment, the receiving antennas are located elsewhere on the body. In an embodiment, the receiving antennas are located somewhere at a distance from the body.

Figure 29:
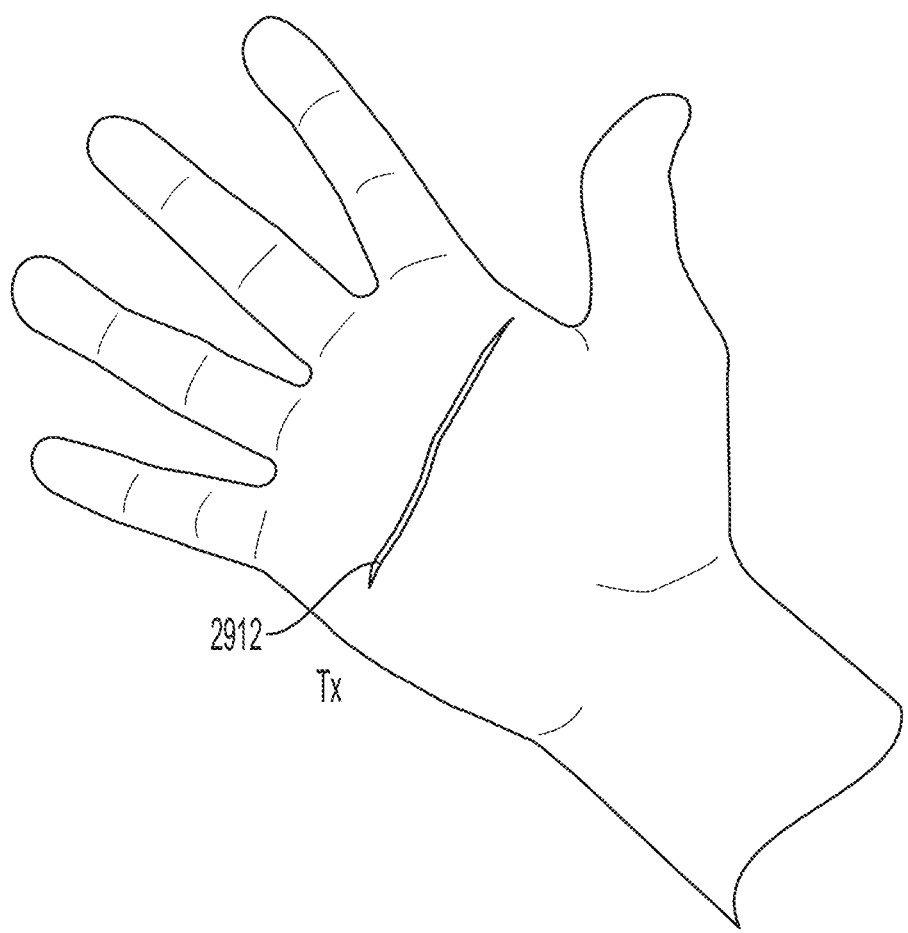
FIG. 29 shows a hand with a transmitting antenna placed thereon.

FIG. 29 shows a hand with a transmitting antenna 2912 placed thereon. Located elsewhere may be receiving antennas that are able to receive signals transmitted from the transmitting antennas 2912. In an embodiment, the receiving antennas are located on the same hand. In an embodiment, the receiving antennas are located on the other hand. In an embodiment, the receiving antennas are located elsewhere on the body. In an embodiment, the receiving antennas are located somewhere at a distance from the body.

Figure 30:
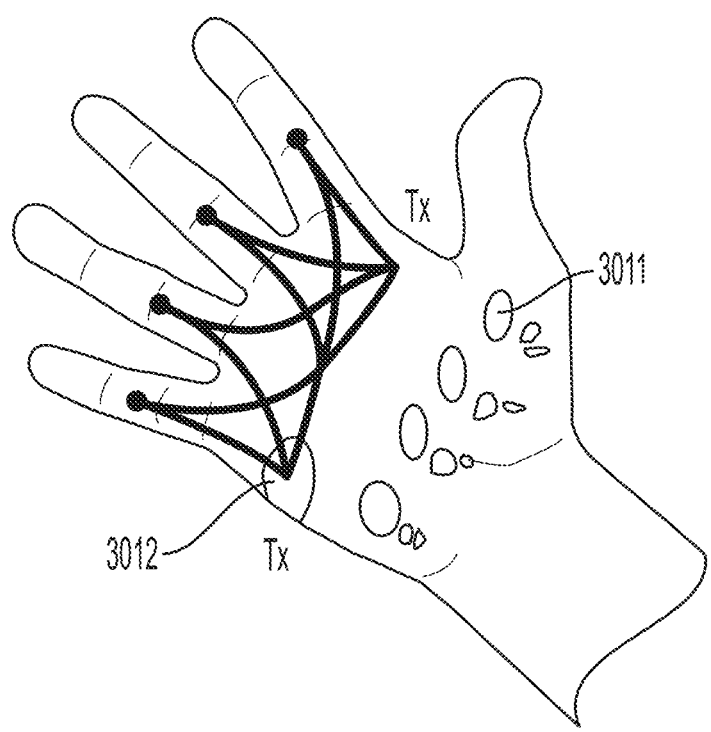
FIG. 30 shows an embodiment of antennas placed on a hand made in accordance with the disclosure.

FIG. 30 shows an embodiment of first antennas 3011 and second antennas 3012 placed on a hand. The first antennas 3011 and the second antennas 3012 are located at different locations on the hand. The first antennas 3011 may function as receiving antennas and the second antennas 3012 may function as transmitting antennas. In an embodiment the roles of the antennas may by vary depending on the needs of the system (e.g., the first antenna 3011 functions as a receiving antenna or a transmitting antenna in different time frames).

Figure 31:
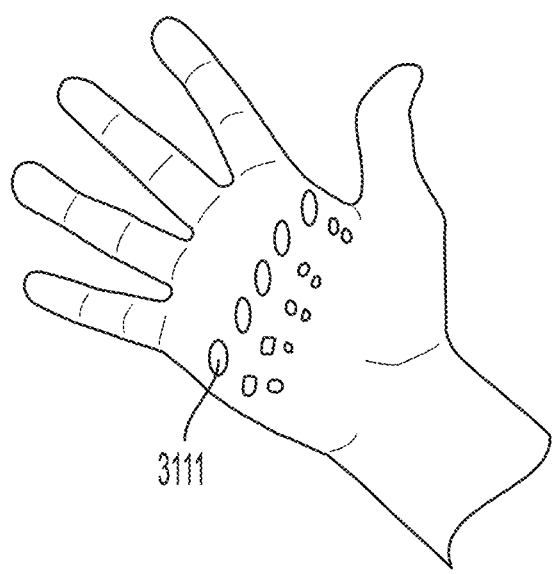
FIG. 31 shows another embodiment of antennas placed on a hand made in accordance with the disclosure.

FIG. 31 shows a hand with receiving antennas 3111 placed thereon. Located elsewhere may be transmitting antennas that are able to transmit signals that are able to be received by the receiving antennas 3111. In an embodiment, the transmitting antennas are located on the same hand. In an embodiment, the transmitting antennas are located on the other hand. In an embodiment, the transmitting antennas are located elsewhere on the body. In an embodiment, the transmitting antennas are located somewhere at a distance from the body.

Figure 32:
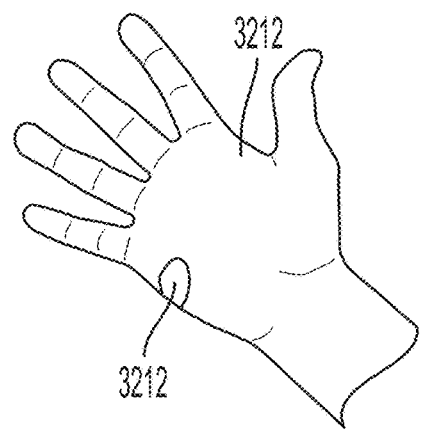
FIG. 32 shows another embodiment of antennas placed on a hand made in accordance with the disclosure.

FIG. 32 shows another embodiment of transmitting antennas 3212 placed on a hand. Located elsewhere may be receiving antennas that are able to receive signals transmitted from the transmitting antennas 3212. In an embodiment, the receiving antennas are located on the same hand. In an embodiment, the receiving antennas are located on the other hand. In an embodiment, the receiving antennas are located elsewhere on the body. In an embodiment, the receiving antennas are located somewhere at a distance from the body.

Figure 33:
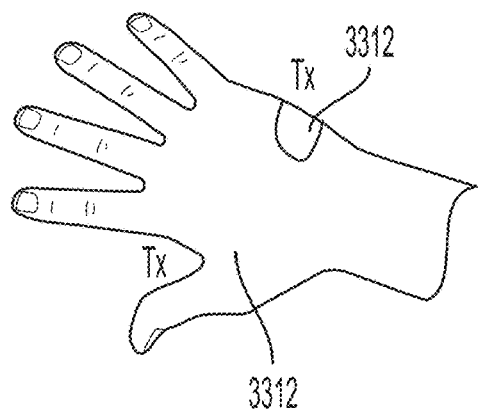
FIG. 33 shows another embodiment of antennas placed on a hand made in accordance with the disclosure.

FIG. 33 shows another embodiment of transmitting antennas 3312 placed on a hand. Located elsewhere may be receiving antennas that are able to receive signals transmitted from the transmitting antennas 3312. In an embodiment, the receiving antennas are located on the same hand. In an embodiment, the receiving antennas are located on the other hand. In an embodiment, the receiving antennas are located elsewhere on the body. In an embodiment, the receiving antennas are located somewhere at a distance from the body.

Figure 34:
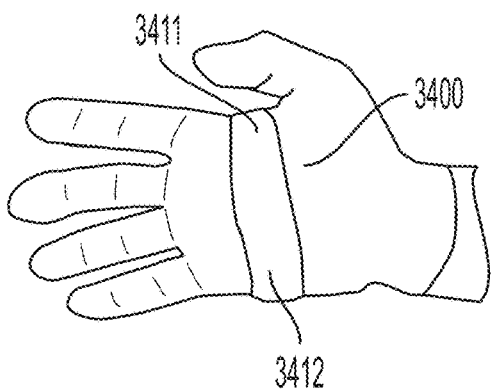
FIG. 34 shows another embodiment of antennas placed on a hand made in accordance with the disclosure.

FIG. 34 shows another embodiment of a band 3400 having a region having at least one transmitting antenna 3412 and a region having at least one receiving antenna 311. In an embodiment, the regions are located at other areas of the band 3400.

Figure 35:
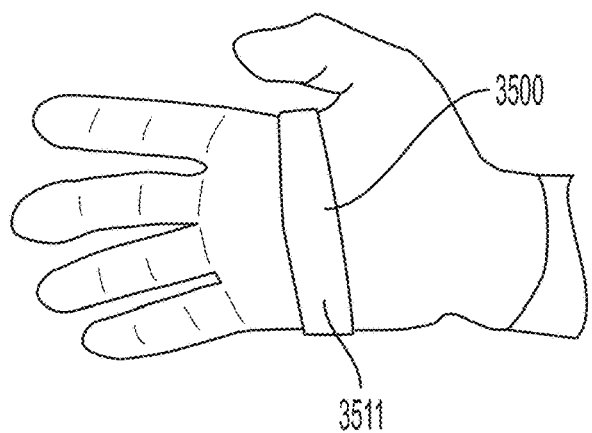
FIG. 35 shows another embodiment of antennas placed on a hand made in accordance with the disclosure.

FIG. 35 shows another embodiment of a band 3500 having a region having receiving antennas 3511 located in the palm area. In an embodiment, the receiving antennas 3511 may be located at other areas of the band 3500.

Figure 36:
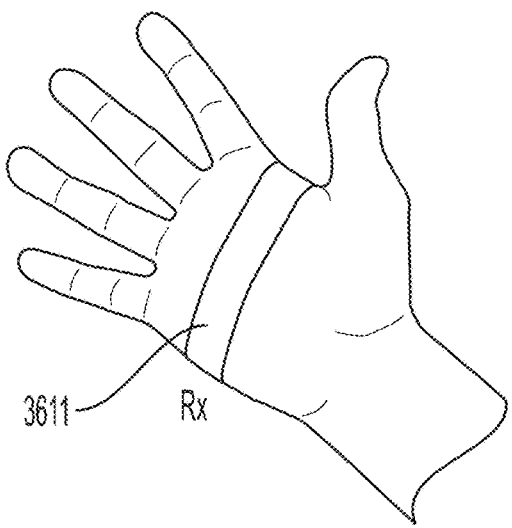
FIG. 36 shows another embodiment of antennas placed on a hand made in accordance with the disclosure.

FIG. 36 shows a hand with receiving antennas 3611 placed thereon. Located elsewhere may be transmitting antennas that are able to transmit signals that are able to be received by the receiving antennas 3611. In an embodiment, the transmitting antennas are located on the same hand. In an embodiment, the transmitting antennas are located on the other hand. In an embodiment, the transmitting antennas are located elsewhere on the body. In an embodiment, the transmitting antennas are located somewhere at a distance from the body.

Figure 37:
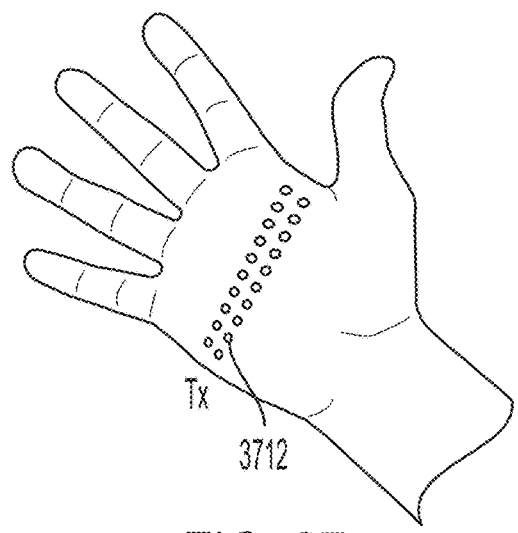
FIG. 37 shows another embodiment of antennas placed on a hand made in accordance with the disclosure.

FIG. 37 shows another embodiment of transmitting antennas 3712 placed on a hand. Located elsewhere may be receiving antennas that are able to receive signals transmitted from the transmitting antennas 3712. In an embodiment, the receiving antennas are located on the same hand. In an embodiment, the receiving antennas are located on the other hand. In an embodiment, the receiving antennas are located elsewhere on the body. In an embodiment, the receiving antennas are located somewhere at a distance from the body.

An embodiment of the disclosure may be a sensor system. The sensor system may comprise a first signal source adapted to generate a first signal on a first antenna, wherein the generated first signal is further infused into a subject; a plurality of second antennas, wherein each of the plurality of second antennas is adapted to receive the first signal generated from the first signal source; a signal processor adapted to take a measurement of the first signal received on each of the plurality of second antennas in order to determine a touch event; and wherein the first antenna is located proximate to the plurality of the second antennas, wherein the first antenna is located between at least two of the plurality of second antennas, wherein the first antenna is adapted to mitigate interference of the touch event by the subject during generation of the first signal on the first antenna and when the first signal is further infused into the subject.

Still another embodiment of the disclosure may be a sensor system. The sensor system may comprise a first signal source adapted to generate a first signal; a first antenna wherein the first signal generated by the first signal source is transmitted by the first antenna; a plurality of second antennas, wherein each of the plurality of second antennas is adapted to receive the first signal transmitted from the first antenna; a signal processor adapted to take a measurement of the first signal received on each of the plurality of second antennas in order to determine a touch event; and the first antenna located proximate to the plurality of the second antennas, wherein the first antenna is located between at least two of the plurality of second antennas, wherein the first antenna is adapted to reduce an impact of the measurement of the first signal on one of the at least two of the plurality of second antennas on another one of the at least two of the plurality of second antennas during transmission of the first signal from the first signal source.

Still yet another embodiment of the disclosure may be a sensor system. The sensor system may comprise a plurality of first antennas; a plurality of second antennas arranged in a matrix array with the plurality of first antennas; a signal generator operably connected to the plurality of first antennas, the signal generator adapted to generate a plurality of signals, the plurality of signals further transmitted from each of the plurality of first antennas, wherein each of the plurality of signals transmitted from each of the plurality of first antennas are frequency orthogonal with respect to each other signal transmitted from each of the plurality of first antennas; and a signal processor operably connected to the plurality of second antennas, the signal processor adapted to process signals received by the plurality of second antennas, wherein processing measurements of the signals received by the plurality of second antennas is used to determine touch events.

Still another embodiment of the disclosure is a device. The device comprises a plurality of first antennas; a plurality of second antennas located proximate to the plurality of first antennas, wherein the plurality of second antennas and the plurality of first antennas are operably connected to a flexible substrate; a signal generator operably connected to the plurality of first antennas, the signal generator adapted to generate a plurality of signals, the plurality of signals further transmitted from each of the plurality of first antennas, wherein each of the plurality of signals transmitted from each of the plurality of first antennas are frequency orthogonal with respect to each other signal transmitted from each of the plurality of first antennas; and a signal processor operably connected to the plurality of second antennas, the signal processor adapted to process signals received by the plurality of second antennas, wherein processing measurements of the signals received by the plurality of second antennas is used to determine touch events.

Although examples have been fully described with reference to the accompanying drawings, it is to be noted that various changes and modifications will become apparent to those skilled in the art. Such changes and modifications are to be understood as being included within the scope of the various examples as defined by the appended claims.

The invention claimed is:

1. A sensor system comprising:
a first signal source adapted to generate a first signal on a first antenna,
an infusion source adapted to transmit the first signal into a subject at a location separate from the first antenna;
a plurality of second antennas, wherein each of the plurality of second antennas is adapted to receive the first signal generated from the first signal source;
a signal processor adapted to take a measurement of the first signal received on each of the plurality of second antennas in order to determine a touch event; and
wherein the first antenna is located proximate to the plurality of the second antennas and between at least two of the plurality of second antennas, wherein the first antenna is adapted to mitigate interference of the touch event by the subject when the first signal is received at at least one of the plurality of second antennas during an integration period.

2. The sensor system of claim 1, wherein the first signal source is operably connected to the first antenna and wherein the first signal source is adapted to infuse the first signal into a subject.

3. The sensor system of claim 2, further comprising a third antenna, wherein the third antenna is operatively connected to a source of ground.

4. The sensor system of claim 1, wherein the first antenna is operably connected to a ground source.

5. The sensor system of claim 1, wherein the first antenna is formed as a strip that extends between the plurality of the second antennas.

6. The sensor system of claim 1, wherein the first antenna is formed as an L shape that extends between the plurality of second antennas.

7. The sensor system of claim 1, wherein the first antenna forms a rectangle that surrounds at least one of the plurality of second antennas, separate from at least one other of the plurality of second antennas.

8. The sensor system of claim 1, wherein each of the plurality of second antennas are dot antennas.

9. The sensor system of claim 1, wherein the first antenna is one of a plurality of first antennas, wherein each of the plurality of first antennas is located between at least two of the plurality of second antennas.

10. The sensor system of claim 9, wherein each of the plurality of first antennas are dot antennas.

11. The sensor system of claim 9, wherein each of the plurality of first antennas are located between more than one pair of the plurality of second antennas.

12. A sensor system comprising:
a first antenna wherein a first signal generated by a first signal source is transmitted by the first antenna;
an infusion source adapted to transmit the first signal into a subject at a location separate from the first antenna;
a plurality of second antennas, wherein each of the plurality of second antennas is adapted to receive the first signal transmitted from the first antenna;
a signal processor adapted to take a measurement of the first signal received on each of the plurality of second antennas in order to determine a touch event; and
the first antenna located proximate to the plurality of the second antennas and between at least two of the plurality of second antennas, wherein signals transmitted from the first antenna mitigate interference of touch events when the first signal is received at at least one of the at least two of the plurality of second antennas during an integration period.

13. The sensor system of claim 12, wherein the first signal source is operably connected to the first antenna and wherein the first signal source is further adapted to infuse the first signal into a subject.

14. The sensor system of claim 13, further comprising a third antenna, wherein the third antenna is operatively connected to a source of ground.

15. The sensor system of claim 12, wherein the first antenna is operably connected to a ground source.

16. The sensor system of claim 12, wherein the first antenna is formed as a strip that extends between the plurality of the second antennas.

17. The sensor system of claim 12, wherein the first antenna is formed as an L shape that extends between the plurality of the second antennas.

18. The sensor system of claim 12, wherein the first antenna forms a rectangle that surrounds at least one of the plurality of second antennas, separate from at least one other of the plurality of second antennas.

19. The sensor system of claim 12, wherein each of the plurality of second antennas are dot antennas.

20. The sensor system of claim 12, wherein the first antenna is one of a plurality of first antennas, wherein each of the plurality of first antennas is located between at least two of the plurality of second antennas.

* * * * *